(12) United States Patent
Bassili

(10) Patent No.: US 12,506,625 B2
(45) Date of Patent: Dec. 23, 2025

(54) NETWORK PLATFORM FOR SECURE DOCUMENT SHARING AND VERIFICATION

(71) Applicant: myLaminin, Kingston (CA)

(72) Inventor: Ash Bassili, Kingston (CA)

(73) Assignee: myLaminin Corp., Kingston (CA)

( * ) Notice: Subject to any disclaimer, the term of this patent is extended or adjusted under 35 U.S.C. 154(b) by 223 days.

(21) Appl. No.: 17/667,849

(22) Filed: Feb. 9, 2022

(65) Prior Publication Data

US 2022/0271958 A1    Aug. 25, 2022

Related U.S. Application Data

(60) Provisional application No. 63/147,294, filed on Feb. 9, 2021.

(51) Int. Cl.
*H04L 9/00* (2022.01)
*H04L 9/08* (2006.01)
*H04L 9/32* (2006.01)

(52) U.S. Cl.
CPC .............. *H04L 9/50* (2022.05); *H04L 9/0891* (2013.01); *H04L 9/0894* (2013.01); *H04L 9/321* (2013.01)

(58) Field of Classification Search
CPC ....... H04L 9/50; H04L 9/0891; H04L 9/0894; H04L 9/321; G06Q 20/367; G06Q 20/3821; G06Q 30/0226; G06Q 2220/00
See application file for complete search history.

(56) References Cited

U.S. PATENT DOCUMENTS

| | | | | |
|---|---|---|---|---|
| 9,397,990 B1 * | 7/2016 | Taly | ........................ | H04L 63/08 |
| 10,079,682 B2 * | 9/2018 | Lu | ........................ | H04L 9/3268 |
| 11,269,859 B1 * | 3/2022 | Luedtke | ................ | G06F 16/245 |

(Continued)

FOREIGN PATENT DOCUMENTS

| | | | | |
|---|---|---|---|---|
| GB | 2599404 A | * | 4/2022 | ............. G06F 21/34 |
| WO | WO-2019191216 A1 | * | 10/2019 | ............. G06F 21/31 |
| WO | WO2020036657 A1 | | 2/2020 | |

OTHER PUBLICATIONS

Jakobsson, M. "Permissions and Privacy". Mar. 18, 2020. IEEE. vol. 18, Issue 2, p. 46-55. doi: 10.1109/MSEC.2019.2946330 (Year: 2020).*

(Continued)

*Primary Examiner* — Hadi S Armouche
(74) *Attorney, Agent, or Firm* — Stephen J. Scribner

(57) ABSTRACT

A network platform for participants including at least one credential (document) holder, at least one credential issuer, and at least one 3rd party, for issuing credentials, managing a holder's digital credentials, and requesting and receiving credentials. The holder provides information relating to a credential to the issuer, and the issuer uses the information to define metadata of the credential and generate and issue a secure credential. The secure credential is maintained over a distributed ledger technology that creates redundancy and provides fidelity in the secure credential. The holder controls access to the secure credential by the at least one 3rd party over the network. The at least one 3rd party is granted access to at least a portion of the metadata in the credential by the holder. The secure credential provides verification of the at least a portion of the metadata to the at least one 3rd party that is granted access.

39 Claims, 19 Drawing Sheets

(56) References Cited

U.S. PATENT DOCUMENTS

| | | | | |
|---|---|---|---|---|
| 11,769,577 | B1* | 9/2023 | Dods | G16H 20/10 |
| | | | | 705/50 |
| 2009/0271863 | A1* | 10/2009 | Govindavajhala | G06F 21/577 |
| | | | | 726/25 |
| 2010/0250955 | A1* | 9/2010 | Trevithick | G06F 21/31 |
| | | | | 713/185 |
| 2011/0072142 | A1* | 3/2011 | Herz | G06F 21/6254 |
| | | | | 709/229 |
| 2015/0278824 | A1 | 10/2015 | Zabar | |
| 2017/0339138 | A1* | 11/2017 | Lewison | H04L 63/0861 |
| 2018/0018343 | A1* | 1/2018 | Zukowski | G06F 16/9535 |
| 2019/0036700 | A1* | 1/2019 | Sundaresan | H04L 9/30 |
| 2019/0163896 | A1 | 5/2019 | Balaraman et al. | |
| 2019/0305949 | A1* | 10/2019 | Hamel | H04L 9/3239 |
| 2019/0385229 | A1* | 12/2019 | Leonard | G06Q 20/389 |
| 2020/0134719 | A1 | 4/2020 | Malik et al. | |
| 2020/0195436 | A1* | 6/2020 | Khan | H04L 9/0637 |
| 2020/0220726 | A1* | 7/2020 | Lougheed, III | G06F 16/211 |
| 2020/0304560 | A1 | 9/2020 | Buchner et al. | |
| 2021/0103984 | A1* | 4/2021 | Leonard | G06Q 40/03 |
| 2021/0192520 | A1* | 6/2021 | Patel | G06Q 20/02 |
| 2021/0351940 | A1* | 11/2021 | Aschauer | H04L 9/30 |
| 2021/0377056 | A1* | 12/2021 | Grainger | H04L 63/0853 |
| 2022/0272085 | A1* | 8/2022 | Novotny | H04L 63/0876 |
| 2022/0294653 | A1* | 9/2022 | Li | H04L 9/50 |
| 2023/0033192 | A1* | 2/2023 | Sutherland | H04L 9/083 |

OTHER PUBLICATIONS

Becker, M. Y., Sewell, P. "Cassandra: distributed access control policies with tunable expressiveness". Jun. 9, 2004. IEEE. Fifth IEEE International Workshop on Policies for Distributed Systems and Networks, 2004. Policy 2004. doi: 10.1109/POLICY.2004. 1309162 (Year: 2004).*

* cited by examiner

NETWORK PLATFORM FOR SECURE DOCUMENT SHARING AND VERIFICATION

RELATED APPLICATION

This application claims the benefit of the filing date of Application No. 63/147,294, filed 9 Feb. 2021, the contents of which are incorporated herein by reference in their entirety.

FIELD

This invention relates to the field of secure document sharing. More specifically, the invention relates to a network platform for secure sharing of documents among network participants wherein security and document verification is provided through features associated with a distributed ledger technology.

BACKGROUND

Individuals, businesses, and governments exchange important documents with their clients, service providers, and other ecosystem partners. Currently there is a heavy reliance on email and document storage services to do so. These are both inconvenient and insecure—particulary with increased digitization, remote work, and ransomware attacks. More importantly, society's reliance on the sharing of documents is at the core of eligibility determination functions of all service delivery organizations in many industries.

Use of cryptographic techniques and blockchain technologies tools has been proposed to address this problem space. As blockchain is not a good repository to store documents due to block size limitations and costs, many past approaches have focused on hashing and encryption of documents or comparing of documents using hashing protocols to deliver security. Other approaches store document addresses on the blockchain to securely facilitate sharing. However, none of the prior approaches enables secure sharing of a document between a network of users to deliver a secure network effect.

SUMMARY

According to one aspect of the invention there is provided a network platform that delivers a more secure, convenient, and controlled document sharing paradigm for document issuers, document holders/owners, and $3^{rd}$ parties that may request such documents from holders or rely on them for their internal business functions, such as a client's potential eligibility for service. Embodiments are not single case implementations, but rather they are industry, institution, and document agnostic. That is, issuers may define, maintain, and issue as many documents as needed of different characteristics and attributes as well as define both selective disclosures associated with these documents and any derived predicates that may be calculated based on their content. Further, issuers may revoke and/or update a credential. Issuers may define and establish ecosystems of organizations with potentially shared clients to create network effects that extend beyond their organizational boundaries—facilitating an ecosystem or network of participants that can co-exist without co-mingling important client information, data, or documents.

For document holders, they have the capability to request their documents/credentials from any issuing authority on the platform and are provided with the necessary input parameters required of them in conjunction with such requests as defined by the issuer. Holders have complete control to share one or more of their documents/credentials separately or jointly with any $3^{rd}$ party requester and control the duration of time that $3^{rd}$ party is able to view or have access to shared document(s) and whether or not the recipient is able to print a copy. Holders can also revoke access to any document shared in the past.

For $3^{rd}$ party recipients of documents, they have 100% certainty of document origin and provenance. They need not exert any efforts or resources internally or through external service organizations to ascertain the authenticity of documents presented to them from the platform because of the provenance and immutability features of the underlying distributed ledger technology protocol.

Unlike prior approaches to document sharing, all participants in the platform—issuer, holder, and $3^{rd}$ party—have the ability to grow the network/ecosystem by inviting new members. In the case of issuers, they can grow the network by adding new issuing authorities or organizations or collaborators within their service delivery value chain that can issue other documents or credentials that are relevant to their organization and/or client base.

According to another aspect of the invention there is provided a network platform for issuing credentials, managing a holder's digital credentials, and requesting and receiving digital credentials, comprising: non-transitory computer-readable storage media implemented across a plurality of devices connected together over the network, the plurality of devices associated with network platform participants comprising at least one holder, at least one issuer, at least one $3^{rd}$ party, and at least one administrator; the non-transitory computer-readable storage media containing stored instructions executable by a processor of each of the plurality of devices, wherein the stored instructions enable the devices to communicate with each other over the network and carry out processing steps, including: the holder device provides information relating to a holder credential to the issuer device; the issuer device uses the information to define metadata of the credential and generate and issue a secure credential; the secure credential is maintained over a distributed ledger technology that creates redundancy and provides fidelity in the secure credential; the holder device has access to the secure credential and controls access to the secure credential by the at least one $3^{rd}$ party device over the network; the at least one $3^{rd}$ party device is granted access to at least a portion of the metadata in the credential by the holder device; and the secure credential provides verification of the at least a portion of the metadata to the at least one $3^{rd}$ party device that is granted access.

In one embodiment, the issuer device performs at least one of defining credentials, maintaining definition of credentials, defining requirements for requests, and issuing and revoking credentials to holder devices.

In one embodiment, the issuer device establishes an ecosystem of 3rd parties with common interests to facilitate sharing of credentials among network participants.

In one embodiment, the issuer device establishes a consortium of members that collectively participate in a private or permissioned environment so that only the consortium members can view, define, issue, maintain, or revoke credentials to other network participants or holders.

In one embodiment, the network platform comprises two or more consortiums, wherein the two or more consortiums co-exist on the network platform without sharing data or transactional knowledge about issuers, holders, and/or 3rd parties.

In one embodiment, the issuer device defines a selective disclosure and/or a derived predicate associated with a credential issued by that issuer.

In one embodiment, the selective disclosure comprises a declarative statement or assertion associated with an issued credential that is used by a holder and provided to a 3rd party to support a fact in the credential without revealing the entire credential.

In one embodiment, the derived predicate comprises a statement based on a Boolean condition that is provided to a 3rd party with respect to a credential.

In one embodiment, an issuer updates and/or revokes a credential without a requirement for instructions of the holder of the credential.

One embodiment comprises a digital wallet that stores holder credentials and is accessible only by the holder device.

In one embodiment, a 3rd party that is not a network platform member requests or receives a credential of a holder on the network platform.

One embodiment comprises a token rewards program for network platform participants that provides rewards or incentives to issuers, holders, and $3^{rd}$ parties for issuing, requesting, and/or sharing their credentials.

In one embodiment, the distributed ledger technology comprises a blockchain.

According to another aspect of the invention there is provided a method for issuing credentials, managing a holder's digital credentials, and requesting and receiving digital credentials across a network, comprising: providing a plurality of devices connected together over the network, the plurality of devices associated with network participants comprising at least one holder, at least one issuer, at least one $3^{rd}$ party, and at least one administrator; wherein each device of the plurality of devices includes non-transitory computer-readable storage media containing stored instructions executable by a processor of each of the plurality of devices, wherein the stored instructions enable the devices to communicate with each other over the network and carry out processing steps, including: the holder device provides information relating to a holder credential to the issuer device; the issuer device uses the information to define metadata of the credential and generate and issue a secure credential; the secure credential is maintained over a distributed ledger technology that creates redundancy and provides fidelity in the secure credential; the holder device has access to the secure credential and controls access to the secure credential by the at least one $3^{rd}$ party device over the network; the at least one $3^{rd}$ party device is granted access to at least a portion of the metadata in at the credential by the holder device; and the secure credential provides verification of the at least a portion of the metadata to the at least one $3^{rd}$ party device that is granted access.

In one embodiment, the method may include the issuer device performing at least one of defining credentials, maintaining definition of credentials, defining requirements for requests, and issuing and revoking credentials to holder devices.

In one embodiment, the method may include the issuer device establishing an ecosystem of 3rd parties with common interests to facilitate sharing of credentials among network participants.

In one embodiment, the method may include the issuer device establishing a consortium of members that collectively participate in a private or permissioned environment so that only the consortium members can view, define, issue, maintain, or revoke credentials to other network participants or holders.

In one embodiment, the method may include establishing two or more consortiums, wherein the two or more consortiums co-exist on the network platform without sharing data or transactional knowledge about issuers, holders, and/or 3rd parties.

In one embodiment, the method may include the issuer device defining a selective disclosure and/or a derived predicate associated with a credential issued by that issuer.

In one embodiment, the method may include the issuer updating and/or revoking a credential without requiring instructions of the holder of the credential.

In one embodiment, the method may include using a digital wallet that stores holder credentials and is accessible only by the holder device.

In one embodiment, the method may include a 3rd party that is not a network platform member requesting or receiving a credential of a holder on the network platform.

In one embodiment, the method may include implementing a token rewards program for network platform participants that provides rewards or incentives to issuers, holders, and $3^{rd}$ parties for issuing, requesting, and/or sharing their credentials.

In one embodiment, the method may include a distributed ledger technology comprising a blockchain.

According to another aspect of the invention there is provided programmed media for use with a plurality of devices connected together over a network, each device comprising a processor, comprising: a code stored on non-transitory computer readable storage media compatible with the processors of the plurality of devices, the code containing instructions to direct the processors to implement a network platform across the plurality of devices, wherein the plurality of devices are individually associated with network platform participants comprising at least one holder, at least one issuer, at least one $3^{rd}$ party, and at least one administrator; wherein the stored instructions enable the devices to communicate with each other over the network and carry out processing steps for issuing credentials, managing a holder's digital credentials, and requesting and receiving digital credentials, comprising: the holder device provides information relating to a holder credential to the issuer device; the issuer device uses the information to define metadata of the credential and generate and issue a secure credential; the secure credential is maintained over a distributed ledger technology that creates redundancy and provides fidelity in the secure credential; the holder device has access to the secure credential and controls access to the secure credential by the at least one $3^{rd}$ party device over the network; the at least one $3^{rd}$ party device is granted access to at least a portion of the metadata in at the credential by the holder device; and the secure credential provides verification of the at least a portion of the metadata to the at least one $3^{rd}$ party device that is granted access.

In one embodiment the processing steps include the issuer device performing at least one of defining credentials, maintaining definition of credentials, defining requirements for requests, and issuing and revoking credentials to holder devices.

In one embodiment the processing steps include the issuer device establishing an ecosystem of 3rd parties with common interests to facilitate sharing of credentials among network participants.

In one embodiment the processing steps include the issuer device establishing a consortium of members that collectively participate in a private or permissioned environment so that only the consortium members can view, define, issue, maintain, or revoke credentials to other network participants or holders.

In one embodiment the processing steps include establishing two or more consortiums, wherein the two or more consortiums co-exist on the network platform without sharing data or transactional knowledge about issuers, holders, and/or 3rd parties.

In one embodiment the processing steps include the issuer device defining a selective disclosure and/or a derived predicate associated with a credential issued by that issuer.

In one embodiment the processing steps include defining a selective disclosure comprising a declarative statement or assertion associated with an issued credential that is used by a holder and provided to a 3rd party to support a fact in the credential without revealing the entire credential.

In one embodiment the processing steps include defining a derived predicate comprising a statement based on a Boolean condition that is provided to a 3rd party with respect to a credential.

In one embodiment the processing steps include an issuer updating and/or revoking a credential without a requirement for instructions of the holder of the credential.

In one embodiment the processing steps include providing a digital wallet that stores holder credentials and is accessible only by the holder device.

In one embodiment the processing steps include a 3rd party that is not a network platform member requesting or receiving a credential of a holder on the network platform.

In one embodiment the processing steps provide a token rewards program to network platform participants that provides rewards or incentives to issuers, holders, and $3^{rd}$ parties for issuing, requesting, and/or sharing their credentials.

In one embodiment the processing steps include using a distributed ledger technology comprising a blockchain.

BRIEF DESCRIPTION OF THE DRAWINGS

For a greater understanding of the invention, and to show more clearly how it may be carried into effect, embodiments will be described, by way of example, with reference to the accompanying drawings, wherein.

DETAILED DESCRIPTION OF EMBODIMENTS

Definitions

Figure 1:
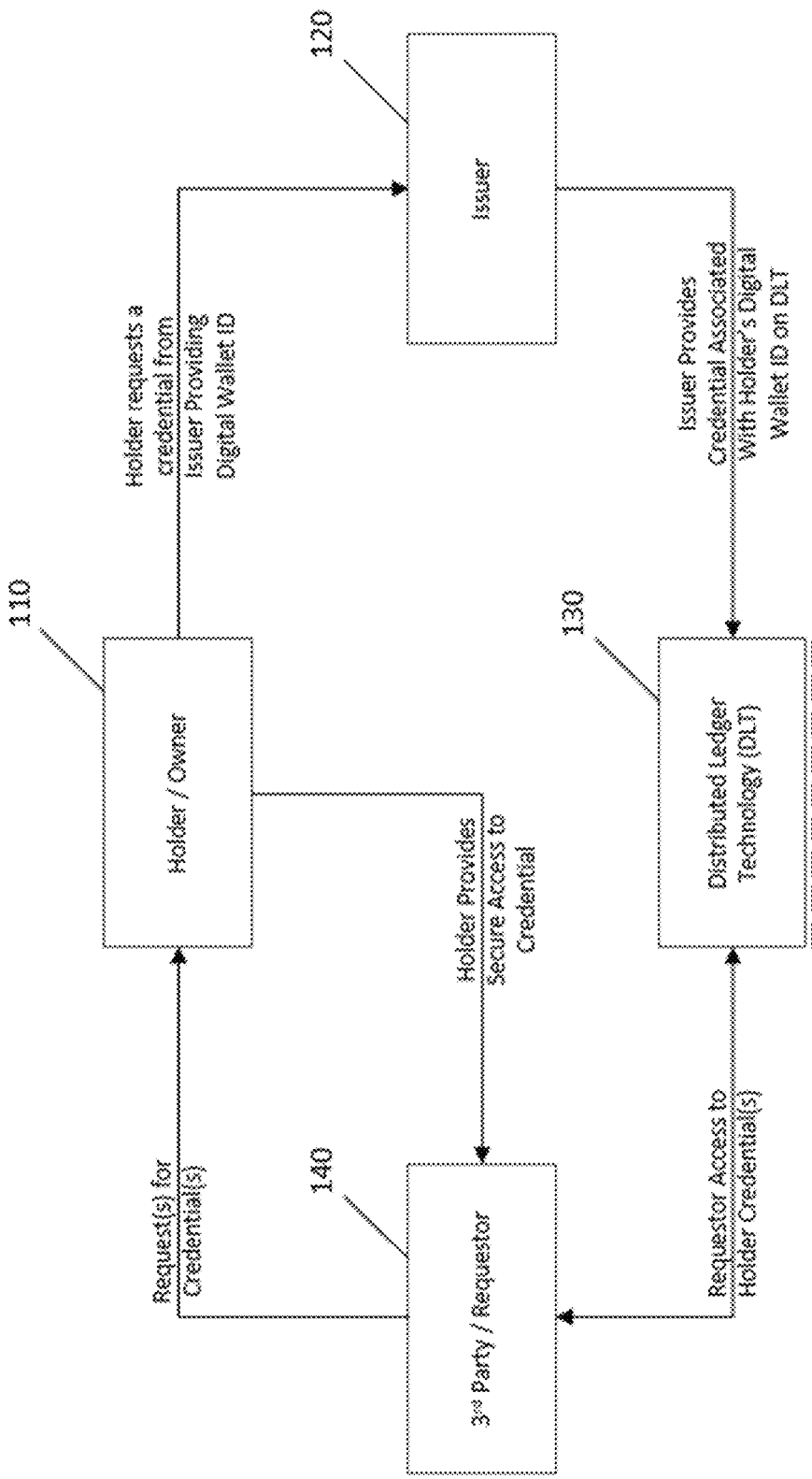
FIG. 1 is a generalized high level block diagram showing information flow among an issuer, a holder, a $3^{rd}$ party, and a distributed ledger technology, according to one embodiment.

As used herein, the terms "holder" and "owner" are synonymous and refer to an individual, citizen, or organization who is the recipient of a verifiable credential that is issued by an issuing authority (issuer) on a platform as described herein. A holder or owner is the owner of a document/credential and has the authority to share such credentials with any $3^{rd}$ party.

As used herein, the term "issuer" refers to a public (e.g., government) or private organization, institution, or issuing authority that issues verifiable credentials to holders. An issuer may be authorized to issue a particular type of document(s) or credential(s), such as, for example, a birth certificate, a passport, a driver's license, university degree, skills certification, or other document that may or may not be classified as primary or secondary identification documents, etc.

As used herein, the term "$3^{rd}$ party" or "verifier" or "$3^{rd}$ party verifier" refers to an individual or organization requiring a credential of a holder and with whom the holder can choose to share access to all or a portion of the required credential. A $3^{rd}$ party is the recipient of a document and/or credential or attestation associated with them as defined by an issuer that is shared with them by a holder.

In some cases, $3^{rd}$ parties may be grouped into an ecosystem. For example, grouping of $3^{rd}$ parties may be based on $3^{rd}$ parties with similar interests or services, or a common clientbase, such as an ecosystem of universities. An ecosystem may facilitate sharing of relevant documents among ecosystem members, e.g., sharing a holder's transcript among universities.

As used herein, the term "client" may refer to an issuer, holder, or 3rd party.

As used herein, the term "user" refers to any user of the network platform, which may be a holder, an issuer, or a $3^{rd}$ party as well as any administrative user who may have limited and/or specific role and capability such as client management and communications functions as may be supported by the platform.

As used herein, the term "consortium" refers to a network of members, e.g., organizations, institutions, issuing authorities, their clients or document holders, and any $3^{rd}$ parties that may be members of an ecosystem or service delivery value chains, that collectively use network platform embodiments as described herein to derive operational and/or client service benefits in conjunction with their operations, such as service delivery functions.

As used herein, the terms "document" "credential" and "verifiable credential" may be used interchangeably and refer to a document issued by an issuer that contains statements, facts, credentials, attestations, information, etc. in a tamper-evident and privacy-respecting manner.

As used herein, the term "selective disclosure" refers to a short and/or declarative statement, assertion, etc., that may be associated with an issued credential. A holder may present a selective disclosure as evidence to support or prove a claim (i.e., a statement, fact, or specific information) in a credential without revealing the entire verifiable credential. A selective disclosure may be provided as defined by the issuer of a specific document.

As used herein, the term "derived predicate" refers to a Boolean condition, such as greater than, less than, equal to, is in set, etc., that may be requested by $3^{rd}$ parties and that may be defined by an issuing authority in conjunction with a specific verifiable credential or its metadata.

As used herein, the term "metadata" refers to attributes and information associated with a credential, such as but not limited to, credential type, credential name, start date, end date, detailed description, and credential data. The metadata are associated with a document or credential on the platform and are associated with a holder's digital wallet id on using distributed ledger technology.

General

Described herein is a software platform implemented, at least in part, with a distributed ledger technology, that enables secure document verification of credentials issued by public (e.g., government) or private sector organizations to a holder where that sharing is at the sole control of the holder of the credentials.

Embodiments enable the establishment of consortiums of parties with shared interests in the simplification of business processes—specifically document verification activities—that they may have in common or are dependent on from each other, e.g., through a distributed ledger.

Other embodiments may allow for the formation of consortiums where parties benefit from the sharing of aggregate data and/or information derived from individually issued credentials to different holders to generate new exchange paradigms for the secure sharing of information useful to ecosystem or consortium members but where that information must be held and controlled securely by each participating document holder.

According to embodiments, issuers can define any number of verified credentials that may be available to their clients—the document holders—on the platform as well as the ability to define and dynamically maintain metadata associated with each of the verifiable credentials, the inputs required from the holders in conjunction with requests for the credentials, and the ability to issue the verifiable credentials. Embodiments also allow issuers to establish a private consortium of members that collectively participate in a private or permissioned environment. That is; issuers can govern network participation—ensuring that only network members invited to participate in the consortium can view, define, issue, maintain, or revoke documents and credentials to other network participants or holders. Issuers can define selective disclosures and derived predicates associated with any verifiable credential they issue.

Selective disclosures may be shared by the document holder in lieu of sharing the full document where the situation does not warrant the sharing of those details. Similarly, derived predicates are short and/or declarative statements that are associated with an issued document but are only available to the holder based on a rule defined by the issuer. These rules may be based on the presence of a date field attribute or other field attribute for that credential as defined by the issuer. For example, if the issuer defines a date attribute associated with a credential, that issuer can define a calculation rule using that date attribute that if true provides the document holder with a declarative statement that the holder can share in lieu of, or in conjunction with, sharing the complete document.

Additionally, embodiments may allow an issuer to define any inputs required from clients in conjunction with any request for credentials. These may be additional fields and/or metadata requirements and/or forms that they may define, which would then be available to potential credential holders for download.

Embodiments provide document holders greater control over their credentials—issued to them by any issuing entity. Embodiments uniquely allow for all holder credentials to be consolidated onto a single platform, and managed through a single application as opposed to having to manage credentials manually or individually through each issuing authority's system. For example, some embodiments may consolidate all holder credentials in a digital wallet account for ease of management, alleviating the issuing authorities from having to issue, manage, and/or maintain digital wallet solutions. Embodiments may allow document holders the ability to deliver selective disclosures or derived predicates associated with any verifiable credential if defined by the issuing authority for that credential. Holders may also see all issuer required inputs, including forms, that may accompany any document request, and they can download the forms as well as upload completed forms in conjunction with any document request from issuing authorities.

In some embodiments holders may invite $3^{rd}$ parties onto the platform to facilitate a more secure sharing of credentials for other organizations with which they may interact.

Embodiments also provide any organization requesting proof of credentials of holders to have 100% certainty in the veracity of those credentials without having to rely on other parties and/or pay for those services to conduct verification activities. Embodiments also deliver selective disclosure and derived predicate capabilities associated with each verifiable credential as defined by the issuing authorities if the document holders wish to do so in lieu of sharing the full document. $3^{rd}$ parties may also be provided the capability of inviting their clients (other parties) onto the platform to enable a more secure sharing of credentials for their ecosystem members.

Only an issuer can place a holder's verified credentials on the platform with the holder's authorization or at the holder's request. And only the holder can provide access to this information to $3^{rd}$ parties requesting credential verification. Consortium members can self-manage and regulate participating issuers and allow or deny membership access based on agreed governance criteria and standards.

Overview of Features

The following is a non-limiting list of features, one or more of which may be implemented in embodiments.

- Holders have centralized digital control over all credentials issued to them by all issuers, i.e., organizations participating in one or more private/permissioned networks.
- Holders exercise control over the sharing of their credentials.
- Holders may provide selective disclosures or derived predicate declarations associated with their credentials without sharing the details of those credentials—if defined and permitted by the issuing authority of that credential.
- Holders have a consistent, secure, consolidated view and control of all their credentials regardless of the issuer of the credentials. This delivers cross-network interoperability for credential holders.
- Holders may store some or all of their credentials in a digital wallet.
- 3$^{rd}$ party credential verification services are not needed by entities (such as government or private sector organizations) to prove authenticity of a claimed credential by any document holder if the origin of that credential is the issuing authority.
- Organizations do not need to be network participants or consortium members to request or receive verification of credentials of holders on the platform.
- Embodiments may implement a token rewards program that enables consortiums and network participants to establish client rewards incentives for issuers, holders, and 3$^{rd}$ parties for a more secure handling/sharing of their credentials.

According to embodiments, issuers have the ability to define credential metadata, issue, update, and revoke client credentials. Issuers may define credentials they will support/issue to holders. This includes all attributes and metadata associated with each credential. That is; issuers have the ability to establish all attributes and maintain those attributes on an ongoing basis with no need for upgrades or modifications to existing systems of record. Issuers also have the ability to do one or more or all of the following:

- Establish all input requirements that must accompany each request for a credential and readily maintain those. These may be data inputs and/or forms that the issuer requires in conjunction with a request for credential.
- Provide Selective Disclosure declarations associated with a credential. For example, "holder is a Canadian citizen" may be a selective disclosure associated with a passport, citizenship certificate, or birth certificate. This allows the holder to share just the selective disclosure declaration attached to the credential issued by the issuer.
- Provide Derived Predicate declarations associated with a credential, which may be based on calculated boolean results using a document attribute. For example, "holder is over the age of 21" may be a derived predicate calculated using an attribute of a document/credential (e.g., birth date on a driver's license). This allows the holder to share the derived predicate declaration defined by the document issuer only if their credential metadata meets the condition defined by the issuer.
- Issue credentials to holders while supplying holders with all metadata they wish to provide including images of the document.
- Update holder credentials at any time without engagement with the holder.
- Revoke a credential at any time without engagement with the holder—as in the case of fraudulent conduct or legal decisions.

Issuers may have the ability to establish and support a selective disclosure associated with any credential. These are available to the document holder to share with any 3rd party document verifiers. Additionally, issuers can define more than one declarative disclosure declarations associated with a single credential. These allow the document holder to present proofs of claims without verifying the entire credential details.

Issuers may have the ability to establish and support derived predicate declarations associated with any credential. These declarations are only valid if a certain condition or calculation, e.g., a calculated Boolean condition, is met. The condition or calculation may use an attribute of the credential metadata associated with that document definition established by the issuer.

Network members may form consortium networks of issuers, holders, and 3rd party verifiers. Issuers may have the ability to establish private/permissioned blockchain environments unique to their consortium members. The consortium members may be other institutions with shared interests and/or common clients that agree to participate in an 'ecosystem' of other issuers, holders, and verifiers under a unique set of governance and/or financial arrangements and protocols. This allows issuers to establish a network of participants that shares a common distributed ledger technology (DLT) architecture, protocols, and cryptographic techniques to define, issue, update, revoke, and share credentials in a consistent manner while also providing the holder complete autonomy and control of any credential issued to them. This also allows a holder to request and receive documents from issuers in different consortiums, allowing the holder to consolidate credentials from issuers on different ecosystems on a single digital wallet.

Consortium networks may co-exist without co-mingling of issuers, holders, and/or verifiers. That is; multiple consortium networks may co-exist on the platform but not share any data or transactional knowledge. This may be implemented by end-to-end encryption of all transactions, use of a distributed ledger technology, and adherence to encryption standards that allow for only the parties of a transaction to have visibility and/or knowledge of the transactional event. Only document holders have a view of issuers and/or 3rd party verifiers that are party to the consortium networks with which they are engaged or participating. Issuers and 3rd party verifiers do not have access to any transaction and/or engagement to which they are not a party.

All network members—issuers, holders, and 3rd parties—may have the ability to seamlessly extend the network by inviting other participants to the network. For example:

- Issuers may have the ability to add new issuing institutions that may be part of their ecosystem and/or organization—e.g., other departments within their organization—with the same capabilities to define and issue other documents or credentials.
- Holders may have the ability to extend invitations to other 3rd party verifiers with which they engage to register and use the platform for document sharing and/or verification activities.
- 3rd party verifiers may also extend invitations to other institutions and/or clients with which they engage to register and use the platform for document issuing, sharing and/or verification activities.

Implementation

Embodiments may be implemented in a network platform having a plurality of devices connected together over the network, including, e.g., at least one holder device, at least one issuer device, at least one member device, at least one $3^{rd}$ party verifier device, at least one administrative user device. Each device may be a cellular ("smart") phone, a tablet computer, a laptop computer, a desk top computer, etc. Each device includes a processor and non-transitory computer-readable storage medium, i.e., storage hardware, non-transitory storage device, or non-transitory computer system memory, etc., referred to herein generally as "storage", that may be accessed by a controller, a microcontroller, a microprocessor, a computer system, a module of a computer system, a digital signal processor (DSP), field-programmable gate array (FPGA), application-specific integrated circuit (ASIC), etc., generally referred to herein as a "processor", having stored thereon computer-executable instructions (i.e., software program, software code, an application ("app")). Accessing the computer-readable medium may include the processor retrieving and/or executing the computer-executable instructions encoded on the medium, which may include the processor running the app on the device. The non-transitory computer-readable medium may include, but is not limited to, one or more types of hardware memory, non-transitory tangible media (for example, one or more magnetic storage disks, one or more optical disks, one or more USB flash drives), computer system memory or random access memory (such as, DRAM, SRAM, EDO RAM) and the like. The processors executing the stored instructions enable the devices to communicate with each other over the network and carry out processing steps. The processing steps enable many or all of the features described herein, and may include the device prompting a user (e.g., a holder, an issuer, a $3^{rd}$ party verifier, etc.) for input.

The devices may be implemented with components (e.g., transmitters, receivers) that enable wired or wireless communications with each other. The network may include one or more remote servers and/or a cloud-based computing resource, wherein processing and/or data storage including, e.g., distributed storage, may be carried out at least partially on the one or more remote servers and/or a cloud-based computing resource. For such communications the transmitter/receiver may be configured to communicate with a network such as the Internet, a Wide Area Network (WAN), a Local Area Network (LAN), a cellular network, etc., to send data (for example sensor data, ECG data, etc.), based on established protocols/standards (e.g., utilizing one or more of radio frequency (RF) signals, cellular 2G, 3G, 4G, LTE, 5G, IEEE 802.11 standard such as WiFi, IEEE 802.16 standard such as WiMAX, Bluetooth™, ANT, ANT+, low energy (BLE), the industrial, scientific, and medical (ISM) band at 2.4 GHz, etc.).

In some embodiments, the network platform is implemented across a plurality of interconnected devices using a distributed ledger technology. An example of a distributed ledger technology is a blockchain, wherein information, data, etc. of a credential may be stored and shared among nodes (computers) that form the blockchain. According to this type of storage, redundancy may be created through use of multiple nodes, and data may be stored in blocks that are "set" in time, linked together to form a timeline or chain. This maintains fidelity of the data stored therein, since, for example, an attempt to alter a credential by altering a record at one instance of the database would fail because the other nodes would not be altered, thus the altered data can be detected by cross-referencing nodes and the integrity of the credential preserved. Throughout this disclosure the term "blockchain" is used; however it will be understood that other distributed ledger technologies may also be used.

In some embodiments, a network platform architecture may include a web-based, server-based, etc. application implemented in various modules. For example, a disrtibuted architecture based on three modules may include module 1, with frontend components including an application layer with user interface screens and flows (e.g., based on React JavaScript library (Meta Platforms, Inc.)) supporting all application users (i.e., holders, issuers, $3^{rd}$ parties, and administrative users) and the functionality required to support them on mobile and/or desktop devices; module 2, with backend primarily concerned with a runtime environment (e.g., based on Node.js, OpenJS Foundation) for the internal flow operation of the application; and module 3, a distributed ledger technology and related services (e.g., a blockchain based on Ethereum™ Blockchain (www.etherium.org) and interface based on a Blockchain-as-a-Service (BaaS) provider application programming interface (API)) which is responsible for features such as smart contract to facilitate creation of secure credentials and completion of actions such as granting access to secure credentials or parts thereof by holders, digital wallet, document storage, event streaming, API gateway (e.g., Web3J API Gateway), blockchain transactions, support for all users, etc., as discussed in detail below.

Also provided herein is programmed media for use with the plurality of devices connected together over a network, each device comprising a processor, wherein the programmed media includes computer code stored on non-transitory computer readable storage media compatible with the processors of the plurality of devices, the computer code containing instructions to direct the processors to implement the network platform across the plurality of devices, wherein the plurality of devices are individually associated with network platform participants comprising at least one holder, at least one issuer, at least one 3rd party, and at least one administrator. Upon the processors of the respective devices executing the instructions, the devices communicate with each other over the network and carry out processing steps described herein for facilitating holder, issuer, $3^{rd}$ party, and administrator activities, such as, but not limited to, issuing credentials, managing a holder's digital credentials, and requesting and receiving digital credentials.

Components

Certain components of the platform are described in Table 1, below, in greater detail.

TABLE 1

| | Description of Components |
|---|---|
| Component | Description/Features |
| Mobile/Desktop App | Provides interface points with the application platform. Designed for the device it's intended for, including mobile devices (such as smart phones, tablets, and laptop computers) and desktop computing |

TABLE 1-continued

Description of Components

| Component | Description/Features |
|---|---|
| | devices. Provides one or more of the following capabilities to the holder, issuer, or $3^{rd}$ party:<br>1) Login, logout, and register as a holder, issuer, $3^{rd}$ party, or administrator on the platform.<br>2) Holder can view all their personal credentials stored on the network (e.g., blockchain (BC)) by issuing authorities.<br>3) Holder can view a dashboard (e.g., FIG. 6A) with counts, summaries, etc., information such as, but not limited to, one or more of:<br>a) personal credentials on the BC,<br>b) document verification requests received from issuers and $3^{rd}$ parties, and<br>c) notifications of system and other activity related to their personal credentials by network participants.<br>4) Holder can view, sort, filter, and search through all personal credentials on the BC by various attributes including but not restricted to: document type, issuing authority, issue date, expiration date, and status.<br>5) Holder can view, sort, filter, and search through all verification requests on the BC by various attributes including but not restricted to: document type, issuer requests, notification date, notification type, status, and action taken.<br>6) Holder can view, sort, filter, and search through all notifications initiated from activity related to their personal credentials either through the application and/or on the BC by network participants using various attributes including but not restricted to: document type, issuer/network participant, notification type requested, notification date, and status.<br>7) Holder can maintain profile and preferences that may include but are not restricted to: email, contact information, preferred contact method, and other account handling protocols.<br>8) Verify a holder's identity through an external identity verification service.<br>9) Set a PIN to be used to further confirm the holder's identity.<br>10) Holder can view cryptocurrency rewards levels achieved and initiate the transfer of those rewards to fiat currency.<br>11) Holder can view issuers participating in the network by searching on country and state/province/jurisdiction, city, etc.<br>12) Holder can view, search, filter, and sort through a list of issuers participating in the network.<br>13) Holder can view for each issuer the documents supported on the platform by that issuer.<br>14) Holder can view,, search, filter, and sort through a list of documents supported on the platform by a given issuer.<br>15) Holder can request from an issuer a given verifiable credential that they support on the platform.<br>16) The application assigns a holder a digital wallet ID in order to associate all verifiable credentials owned by that holder to his/her digital wallet.<br>17) The application may direct the holder to the appropriate issuer web page to get more information directly from the issuing authority.<br>18) The application may prompt or present to the holder all required inputs that must be delivered to the issuer in conjunction with any verifiable credential request. These may be additional information, forms, or combinations of these that must be provided in conjunction with document requests.<br>19) Holders can view all issuers in a selected country, state/province/jurisdiction, city, etc.—within their network/consortium as defined by network governance rules established, maintained, and administered by consortium members.<br>20) Holders can view, scroll, filter, sort, and search through all types of verifiable credentials for a selected issuer.<br>21) Issuers can add verifiable credentials on the platform with attributes such as but not restricted to: document type, document name, start date, end date, and detailed description. These document metadata (attributes) are stored on the BC for each credential by the issuing authority (issuer) and shared with the holder of the credential in question.<br>22) Holders can identify and update verifiable credentials on the platform with attributes such as but not restricted to: document type, document name, start date, end date, and detailed description. |

TABLE 1-continued

Description of Components

| Component | Description/Features |
|---|---|
| | 23) For each verifiable credential, the issuer will have the option of identifying all inputs required from holders in conjunction with their requests.
24) Issuers also can define and/or establish any Selective Disclosure and/or Derived Predicates that are associated with each verifiable credential.
25) Issuers can add and maintain all their Verified Credentials and their properties at any time giving organizations complete flexibility in the timing of their deployment or availability to the public.
26) The application may present to the holder all credentials connected to the holder's digital wallet identifier. That is; different networks may be associated to different consortiums and the holder may view all credentials associated with a specific network or all networks combined as these credentials will be consolidated to a single digital wallet.
27) The application may permit the holder to share one or more credentials with any $3^{rd}$ party simply using e.g., email. The holder may provide time-boxed permission to access but not necessarily to download, retain, or print a copy of one or more credential associated with the holder's digital wallet at the discretion of the holder.
28) The holder may have the option of allowing recipients of credentials to print and/or retain a copy of a credential.
29) The application may permit a holder to act in a custodial role for credentials that belong to family member who may be a minor or for which the holder is the guardian or caregiver.
30) The application may support transfer of credentials from custodial accounts to minors once they reach the appropriate age to manage and own their credentials as may be defined by regulatory and legislative requirements. Examples of such credentials may include but are not restricted to: birth certificate, vaccination record, and other health records and certificates.
31) The application may call and interact with an application server that may be hosted on premise or in a cloud services provider.
32) The application may call an appropriate smart contract in support of various transactions as defined in the application logic to support the features described. |
| Mobile & Desktop app Server | The application server has the functionality and capability to support the holder, issuer, $3^{rd}$ party, and administrator application logic to implement the features described above and to manage the database CRUD (create, read, update, delete) transactions as required by the mobile and desktop applications. This may include specific database calls and logic to execute these transactions and manage the appropriate error handling as required, and may include managing transactions that require activity on and/or off the BC. |
| Database(s) | In one embodiment the platform may include at least one NoSQL database, such as mongoDB, which stores all off-chain data required by the application. Field level encryption may be applied to all data in transit and at rest.
In one embodiment, network participants may need to share the actual document image or may need greater detail than provided in the metadata information of the credential stored on the BC and shared with holders. In these scenarios, the platform may support the integration of off-chain database platforms such as NoSQL databases and/or IPFS (Inter-Planetary File System) hash table addresses stored on the BC for restricted sharing with other network participants. This restricted sharing may be controlled through server and smart contract logic and may only permit authorized network participants or holders to view the credentials using the cryptographic content hash. Such embodiments enforce a truly distributed web and allow the original documents to remain with the issuing authorities. |
| Digital Wallet Registration/Administration | On registration, users may be assigned a digital wallet ID. This component or parts thereof may optionally be implemented and may include functionality internal to the administration of the network. For example, use of a BaaS may obviate the need for all or parts of this component. Embodiments may support the one or more of the following capabilities:
1) Ability to control network participant access, including
a) Confirming that issuers have been contracted to transact on the platform and are authorized to establish issuing organizations and verifiable credentials that are then visible to holders on the platform.
b) Enforcing control over holder accounts to freeze and/or lock out holders in response to any legal action and/or circumstance where legally required to do so. |

TABLE 1-continued

Description of Components

| Component | Description/Features |
|---|---|
| | i) Freezing a holder account may permits the holder to continue to have access to their credentials but not request additional documents from issuers or share their credentials with $3^{rd}$ parties.<br>ii) Locking a holder account prevents a holder from logging in or accessing the account where legally required to do so.<br>c) Ability to maintain a listing of document types and/or document templates.<br>2) Ability to establish a smart contract defining a cryptocurrency rewards program including incentives and protocols governing the rewards program, wherein holders receive rewards as cryptocurrency (e.g., a "network token") for using the platform. For example, a token may be earned for each secure credential created, for each 3rd party to which access to a secure credential is granted, etc. Such embodiments may include a cryptocurrency network token smart contract to facilitate such a rewards program. Other types of rewards programs (i.e., based on rewards other than cryptocurrency) may also be implemented.<br>3) Ability to support the integration of issuer API to add defined documents on the BC.<br>4) Ability to define frameworks underlying the documents to be defined and issued by issuing authorities. |
| Smart Contracts | This component of the platform is responsible for transactions affecting the content on the BC. This may include but is not restricted to the following:<br>Registration of holders<br>Registration of holder credentials<br>Registration of issuers<br>Registration of holder signup<br>$3^{rd}$ party verification requests<br>Issuer document metadata<br>Register of issuer credentials<br>Registration of recovery delegates<br>Smart contracts may control access to BC data. For example, they may ensure that only network participants with authority to add, update, or access data on the BC are able to do so, while non-consortium members are restricted from doing so.<br>Smart contracts may also be used to administer a rewards program. Rewards may be earned by holdes, issuers, and 3rd parties for using the network platform, referring other parties who become network members, etc. A rewards program may be unique to a consortium or may be standard across the platform. |
| Blockchain | This component of the platform is the BC network of nodes supporting all network participants. The BC may include one or more private/permissioned blockchains that comprise the various consortiums/networks supported as well as the consensus algorithms and protocols enabling them. |
| Cryptocurrency Network Token | In some embodiments a cryptocurrency component may be implemented to support the platform for all participating networks and support the rewards program. Reward thresholds and supporting mechanisms may be established by the consortium of governing bodies established to manage the platform and the rights and obligations of network participants. This may also provide input to an external method and/or process to manage the rewards program on behalf of consortium members based on agreements reached and established by consortium governance arrangements. |
| Cryptocurrency Network Token Smart Contract (specific for each network) | In some embodiments a smart contract may be unique to each network and the agreements reached between network participants regarding the appropriate rewards for each participant engagement. This may include rules that define the rewards based on transaction volumes or value delivered to network participants through each transaction. |
| $3^{rd}$ Party Verification Request Module | This component of the platform facilitates a request by a $3^{rd}$ party of personal credential verification from holders. This process may include soliciting specific documents or credentials from holders through either email or through the platform. This module facilitates the interaction between $3^{rd}$ parties and holders and allows the holder to provide requesting $3^{rd}$ parties time-boxed access to the requested credential(s) or the ability to confirm the authenticity of the claimed credentials or the metadata associated with the credential(s) in question based on the type of verification requested.<br>In some scenarios only a simple verification is needed to confirm the holder has a valid credential that is current and in good standing, as opposed to the specifics or metadata associated with that credential. For example, it may suffice to understand for citizenship confirmation that the holder is in possession of a non-expired U.S. passport as |

TABLE 1-continued

Description of Components

| Component | Description/Features |
|---|---|
| | opposed to understanding what date it was issued or when it expires. This may be supported through either a selective disclosure and/or a derived predicate associated with a holder's credential. To implement this capability the component may provide credential requesting organizations tokens with encrypted keys that provide access to the holder credential(s) stored on theBC. |

Embodiments described herein provide a number of technical advantages, including but not limited to the following:

Consortium Formation and Governance

The ability of institutions to form self-governing consortiums with assurance of security within and for their members. This feature is not available in other prior approaches. Members of a consortium can grow the networks according to the governance standards established by consortium members.

Cross-Consortium Benefits

Allow consortiums of organizations that may be competitors but with common clients to achieve several benefits including but not limited to: operational efficiencies, better client service, digital transformation, adoption of blockchain technologies, extension of organizational boundaries beyond their immediate client base but including other ecosystem partners and participants. Potential collective analytics insights as well as artificial intelligence enablement would be far greater than delivering independent digital wallet or single use case solutions focused solely on the organization's business model.

Cross-Consortium Interoperability for Common Clients

Document holders that are clients of multiple issuing authorities may view all their credentials regardless of which issuer and/or consortium (network) that credential was issued from.

Consolidation of Personal or Institutional Credentials

Prior document verification activities are tied to fragmented centralized data repositories that are held by different organizations if the issuing authorities provide such access. In most cases, personal credentials are in physical form (paper or plastic card) or received in emails. In contrast, embodiments give the holder of the credentials control over those assets—even if they are stored in centralized data repositories managed and controlled by the issuing authorities by leveraging the features of both distributed ledger technologies, encryption, as well as IPFS databases—if needed—by providing a benefit to issuing authorities, individuals, and $3^{rd}$ parties requesting credential verification.

Issuing Authorities Retain Control Over Credentials (if Required)

Issuing authorities (government/public or private sector organizations) can exercise complete control over the issued credentials, if they choose to do so.

E.g., governments are likely to see benefits of not permitting access to passports issued to citizens or transmitting these certificates digitally but are willing to share metadata with the citizen regarding his issued passport. This metadata could include items currently shared such as: issue date, place of issue, and expiration date. In some cases, the issuing authority may want to take credentials out of circulation. In some embodiments, issuers have the capability to merely expire an issued credential rendering that document immediately unshareable by the holder.

However, in the case of an educational institution, they may not need to maintain control over a university degree certificate.

Holder Controls Access to Personal Credentials

Holders have the sole responsibility of sharing their credentials with any requesting 3rd party as opposed to merely attesting credentials to requesting $3^{rd}$ parties and then having those $3^{rd}$ parties undertake the cost or effort to verify the authenticity of the credentials and accuracy of the attestations. Holders may also provide any selective disclosure and/or derived predicate associated with a valid credential as established by an issuing authority.

Network Effect Through the Platform Rewards Program Administered by Smart Contracts Embodiments may incorporate a cryptocurrency token that delivers a reward for participation and use of the platform by all network participants. Rewards may be tailored for each consortium through the establishment of rewards levels and the administration of those by a smart contract.

Issuers have Greater Control Over Digital Credentials

Issuers may quickly update and/or revoke entirely a digital credential for any operational/security reason. That is; an issuing authority can take a document out of circulation by simply revoking a prior issued credential. This has the immediate effect of disabling the holder's ability to share that credential with any $3^{rd}$ party. In contrast, in prior approaches a holder can continue to fraudulently present a credential that may have been revoked by the issuer.

No Handling/Manipulation of Original Documents Required

Embodiments do not require any handling of original documents by any network participants. The holder does not need to copy, email, etc., their documents to any $3^{rd}$ party requesting proof of credentials. The issuing authority is not required to do any additional processing or manipulation of the original document. Organizations requesting credential verification from holders need not receive those documents or copies of them to be assured of their authenticity as only the issuing authority can put a holder's credential on the blockchain.

No $3^{rd}$ Party Verification Service Providers are Required

According to embodiments, there is no need to engage a verification service provider or perform any kind of verification of credentials beyond the confirmation that is delivered from the platform. This is provided by the following features:

(1) Only issuing authorities can establish a holder credential on the platform. This ensures the authenticity of the credential metadata recorded on the platform, and (2) The holder is not providing a requesting 3$^{rd}$ party the confirmation of the credential(s) but merely providing access to proof of the information on the platform.

The invention is further described by way of the following non-limiting examples.

Example 1

FIG. 1 is a simplified block diagram of an implementation of a network platform, which may be implemented in computer hardware and software, according to a generalized embodiment. Referring to FIG. 1, each of the entities represented at 110, 120, 130, and 140 includes at least one device. At 110, a holder device of an individual or an organization runs a holder app wherein information relating to a credential request is provided to a device 120 of an issuing authority (i.e., issuer) with a request that the issuing authority place the credential on the platform. The issuer device 120 runs an issuer app that uses the information to generate a secure credential which is stored on the platform in a distributed ledger technology 130. The holder may use a digital wallet or other structure to maintain access to the holder's one or more secure credentials, provided by one or more issuers. The holder, via the device 110, may interact with an organization or individual (i.e., 3$^{rd}$ party), via the 3$^{rd}$ party's device 140, that requests/requires verifiable information about the holder. The holder 110 may grant the 3$^{rd}$ party 140 access to one or more secure credentials, or to at least a portion of one or more secure credentials, in order to complete the interaction. For example, the holder may provide a time-boxed secure key to access the credential. The 3$^{rd}$ party may obtain confirmation of the validity of a credential or portion thereof using, e.g., a time-boxed token provided by the holder 50. The 3$^{rd}$ party may be maintained as part of the holder's network for the secured credential(s), or part(s) thereof, for which access has been granted.

Example 2

Figure 2:
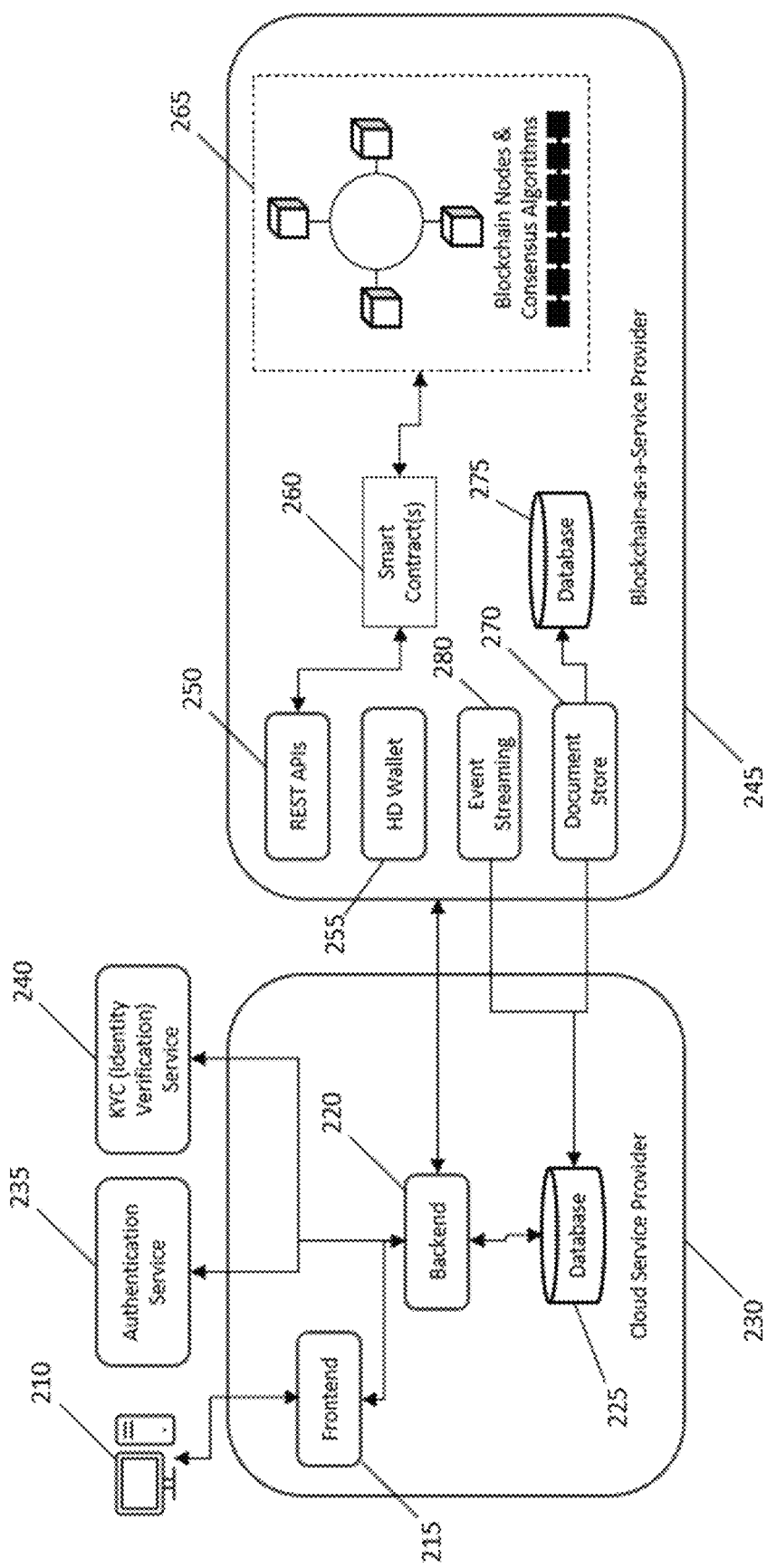
FIG. 2 is a block diagram of a high level system component architecture, according to one embodiment.

This is an example of various system components of the platform architecture, which may be implemented in computer hardware and software, according to one embodiment. Referring to FIG. 2, a user may access the platform via device 210 running an app that provides specific utilities depending on whether the user is a holder, issuer, 3$^{rd}$ party, or administrative user. An application frontend 215 receives user input and presents results back to the user. A backend server component 220 of the application receives user input request and includes, e.g., web servers, file systems, and application servers that support the application. A NoSQL database 225 (such as, e.g., mongoDB) supports off-BC data storage requirements of the application. In some embodiments the frontend 215, backend 220, and database 225 may be implemented with an Infrastructure-as-a-Service (IaaS) 230 service provider 230.

An external authentication service 235 may be used to authenticate users and manage access to the application, and an know your client (KYC) external identity verification service 240 may be used to verify the identity of users so as to ensure that the platform is not used fraudulently or in support of illegal activities.

A distributed ledger technology 245 may be implemented with a Blockchain-as-a-Service (BaaS) provider to establish a private/permissioned blockchain environment, nodes, and consensus algorithms supporting the platform. The BaaS may be used to implement features including a REST API gateway 250 that is called by the backend server program to action many of the transactions on the BC, a heirarchical deterministic (HD) wallet service 255 that is used to provide users unique digital wallet IDs, smart contracts 260 (e.g., based on Solidity programming language) used to change states on the BC, BC nodes 265 and supporting consensus algorithms that are used on the private/permissioned BC supporting the platform, a document storage service 270 that is used to store off-chain data required in support of the application. In some embodiments, the platform may store documents on the BaaS provider datastores 275. In other embodiments, the documents may be stored in other cloud-based repositories such as AWS S3 buckets or Microsoft Blobs. Event streaming 280 may also be implemented on the BaaS provider service to detect state changes on the BC and facilitate the connection of on-chain transactions with off-chain systems by triggering business processes, events, and notifications, etc.

Example 3

Figure 3:
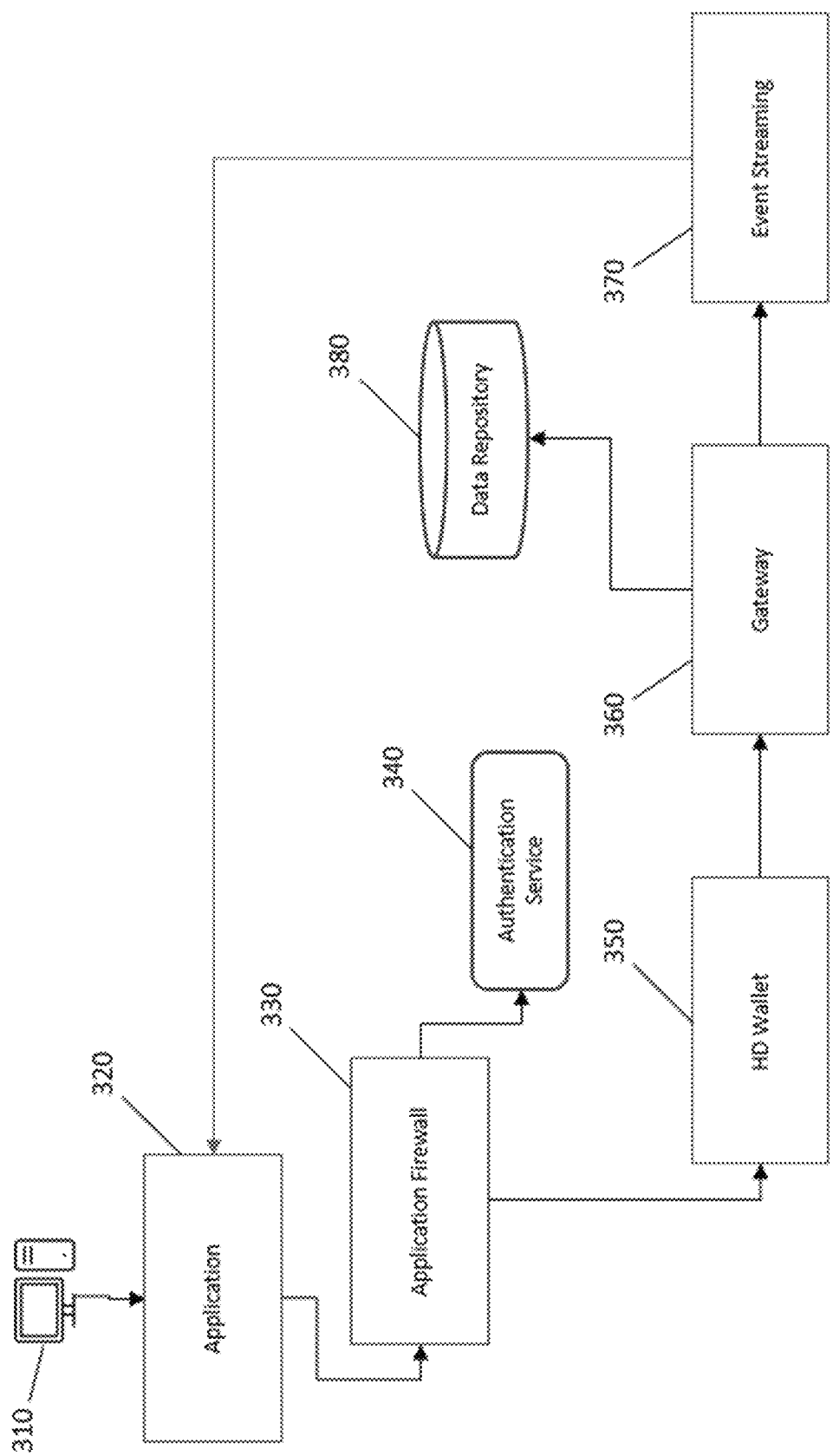
FIG. 3 is a high level block diagram depicting key interactions a blockchain-as-a-service (BaaS) provider and key services utilized through that platform, according to one embodiment.

This is an example of interactions with BaaS provider components or services of the platform architecture, according to one embodiment. Referring to FIG. 3, a user may access the platform via device 310 running an app that provides specific utilities depending on whether the user is a holder, issuer, 3$^{rd}$ party, or administrative user. Frontend and backend components of the platform are shown at 320. The frontend of the application receives user input and presents results back to the user. The backend server component receives user input requests and includes web servers, file systems, and application servers that support the application. An application firewall component 330 ensures appropriate authentication and authorization of application connections to the platform resources. This service may integrate with an external authentication service provider 340 and allow for low-level blockchain permissions to be embedded in user authentication tokens. A digital wallet (e.g., heirarchical deterministic (HD) wallet) service 350 may be implemented by the BaaS provider and used by the application to provide users unique digital wallet IDs. The BaaS provider may be used to implement a gateway 360 such as REST API that is called by the backend server program to action many of the transactions, i.e., event streaming 370, on the BC. The BaaS provider may be used to implement a service that detects state changes on the BC and facilitates the connection of on-chain transactions with off-chain systems by triggering business processes, events, and notifications. Data storage in a data repository 380 may be implemented according to protocols and peer-to-peer network technologies (e.g., interplanetary file system (IPFS)).

Example 4

Figure 4:
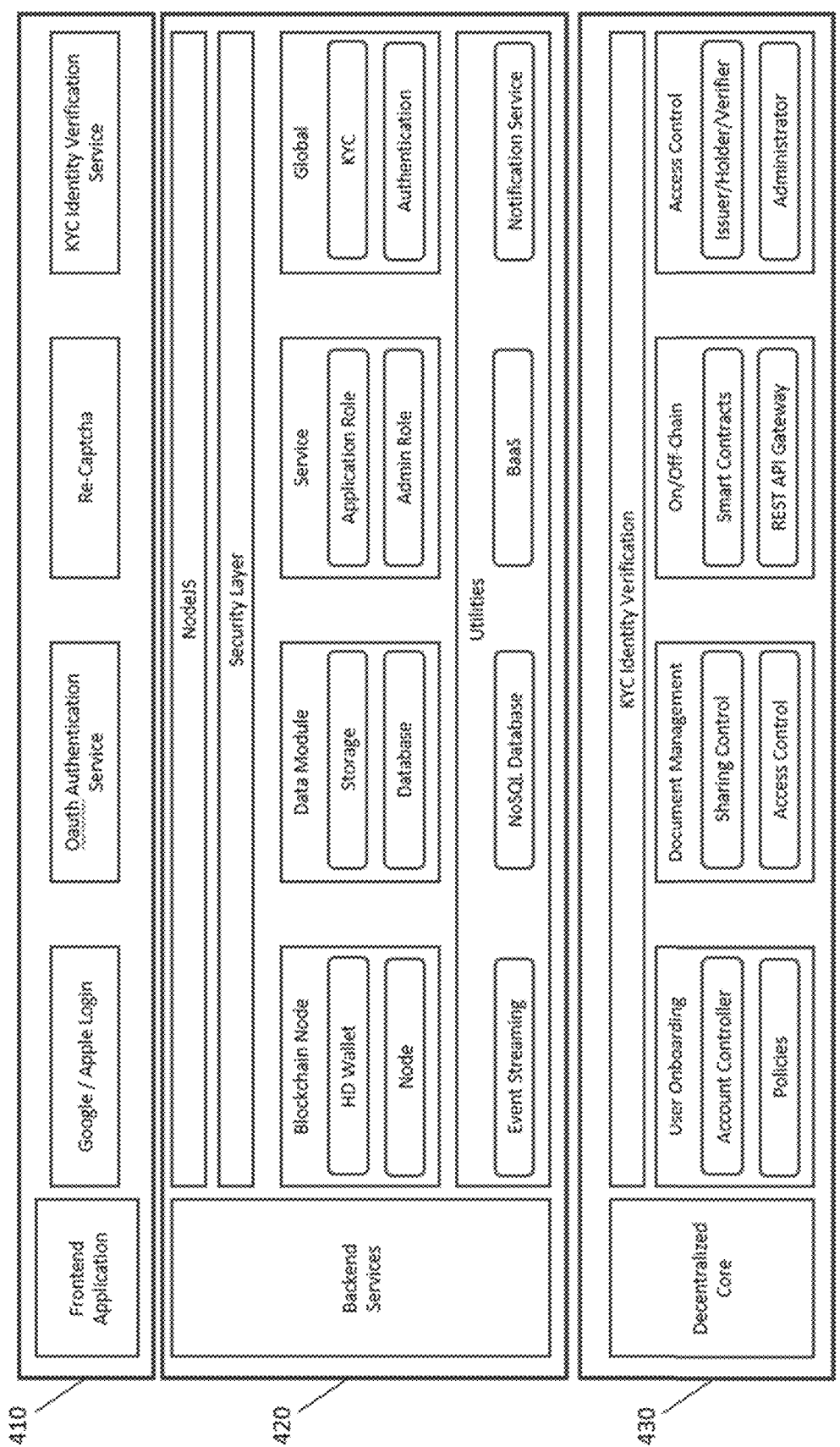
FIG. 4 is a block diagram of a platform backend system layer distributed in three tiers, according to one embodiment.

This example describes a platform architecture divided into three main layers, including, as shown in FIG. 4, a frontend application 410, backend services 420, and a decentralized core 430. These are described below.

Layer 1 is the application layer and includes frontend application components such as user interface screens and flows for all application users and the functionality required to support them. This is the entry point for users and provides the power for users to intuitively and securely access the service. The application layer provides features such as digital wallet modules for information management. Implementation may use a tool such as, for example, React JavaScript library (Meta Platforms, Inc.). Various user interface flows are described in Examples 5 and 7-11, below. Layer 1 includes login capabilities, which may include a federated login such as through Google®, Apple®, and other parties, OAuth providers, captcha service to detect bots and fraud, and KYC identity verification services.

Layer 2 includes backend service architecture and provides a runtime environment for the internal flow operation of the application, serving all application layers and the decentralized core layer. Layer 2 is connected with the security layer of the system and identifies and validates incoming requests. The service layer has internal modules such as blockchain nodes, data module, services, user role administration and privileges, other utilities including notification services and global integrations. An additional layer may include third party services such as, for example, Kaleido Networks, Google firebase and mongoDB which are securely connected through the security layer with authentications access. Layer 2 may be implemented using a tool such as, for example, Node.js (OpenJS Foundation).

Layer 3 includes decentralized core functions of the platform including, for example, user onboarding and account policies, document sharing and access control, on- and off-chain activities managed and executed by Smart Contracts, and other APIs.

Example 5

Figure 5:
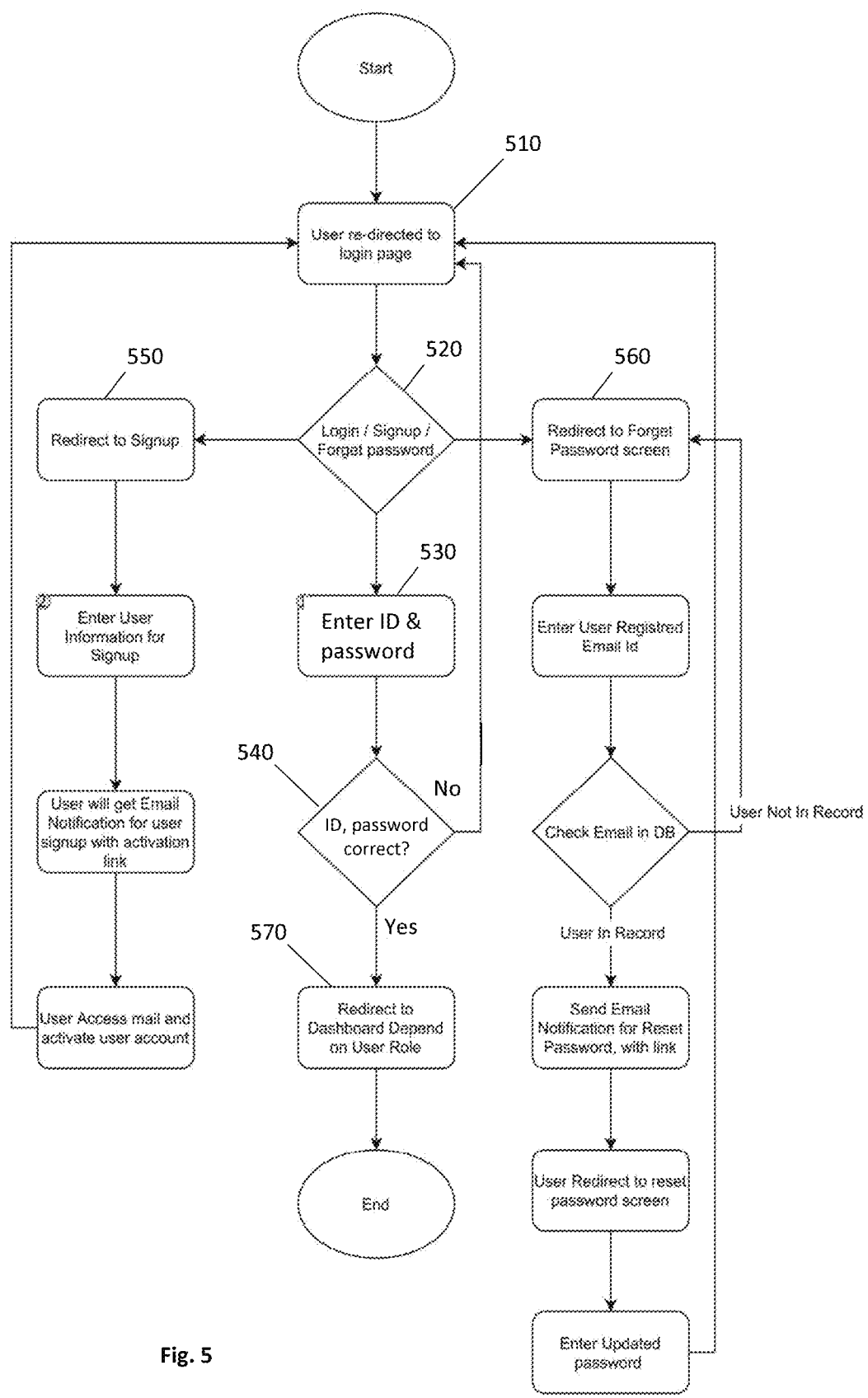
FIG. 5 is a flowchart depicting processing steps for a login system, according to one embodiment.

This is an example of an application login flow, with reference to FIG. 5, for user signup, login, and forgot password functionality. Referring to the FIG. 5, the process begins when users are directed at 510 to a login page 520 where a user enters login info 530 (username, ID, password, etc.), and user login protocol supports checks 540. At 520 new users are rerouted to registration flow 550 and subsequent steps to obtain and access a user account. Also at 520 users may be redirected to password resetting at 560 for forgotten passwords, with subsequent processing steps to obtain a new password. In the case of both new users as well as forgotten passwords, users are directed to check their email to complete the signup or signin process. On successful login, the user is directed to the default dashboard screen 570 for the specific user type (holder, issuer, 3$^{rd}$ party, or administrative user). Examples of holder and 3$^{rd}$ party dashboards are shown in FIGS. 6A and 6B, respectively.

Example 6

Figure 6A:
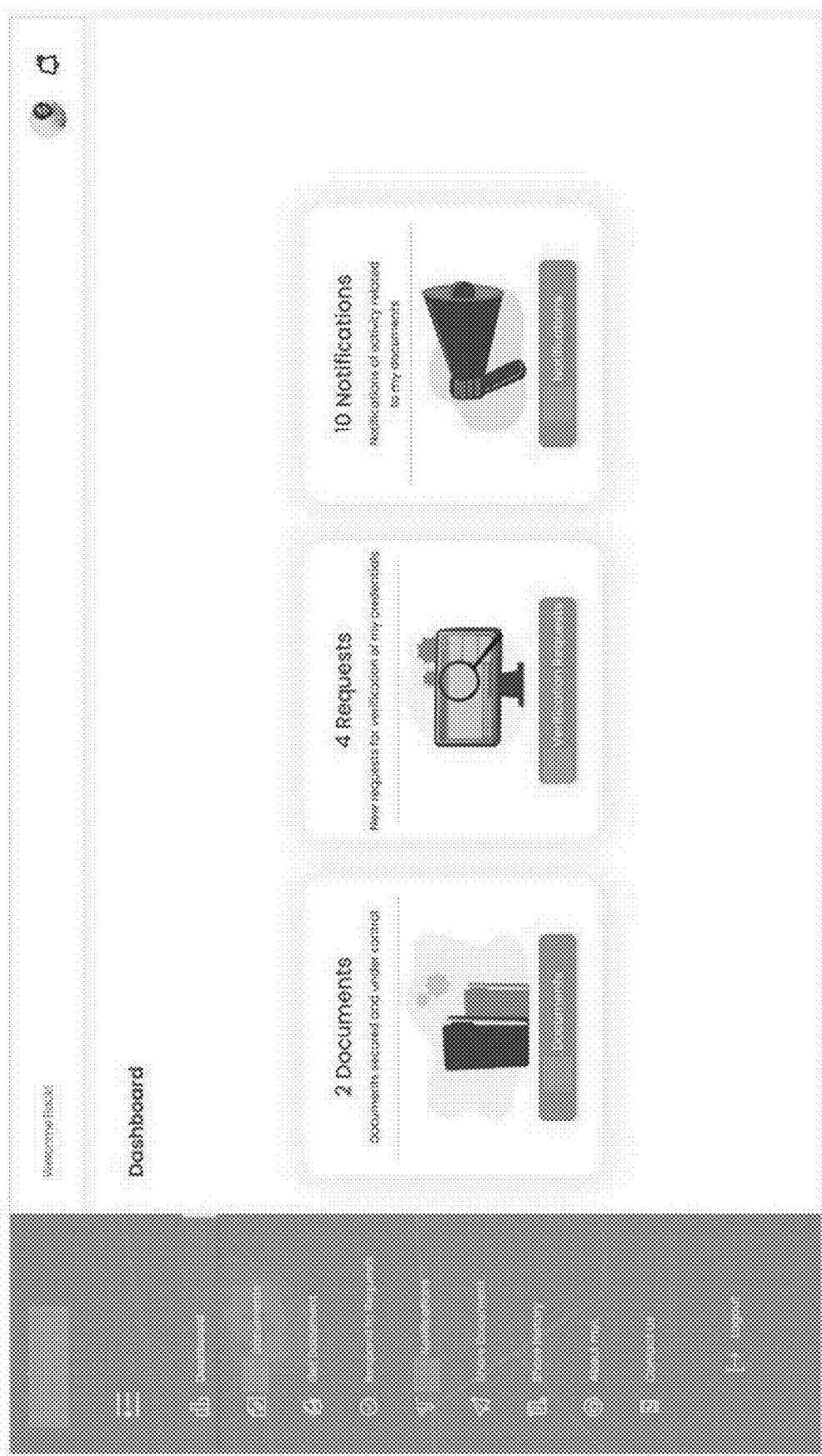
FIGS. 6A and 6B are screen shots of exemplary holder and $3^{rd}$ party dashboards, according to embodiments.
Figure 6B:
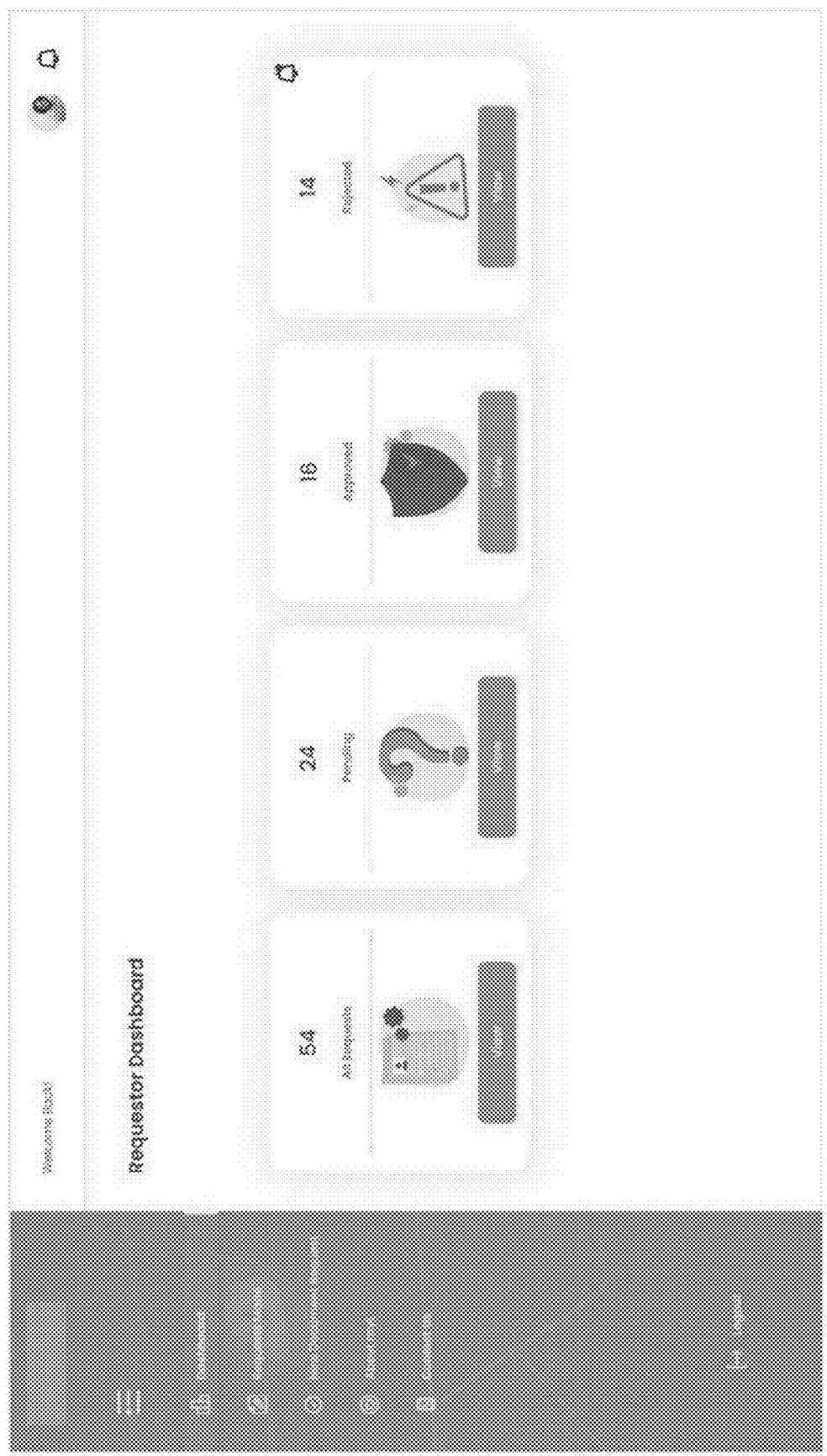

This example provides screenshots of holder and 3$^{rd}$ party dashboards, shown in FIGS. 6A and 6B, respectively, as may be provided by applications (i.e., software stored on computer readable media) running on processors of respective holder and 3$^{rd}$ party devices as part of a network platform according to embodiments described herein.

Example 7

Figure 7:
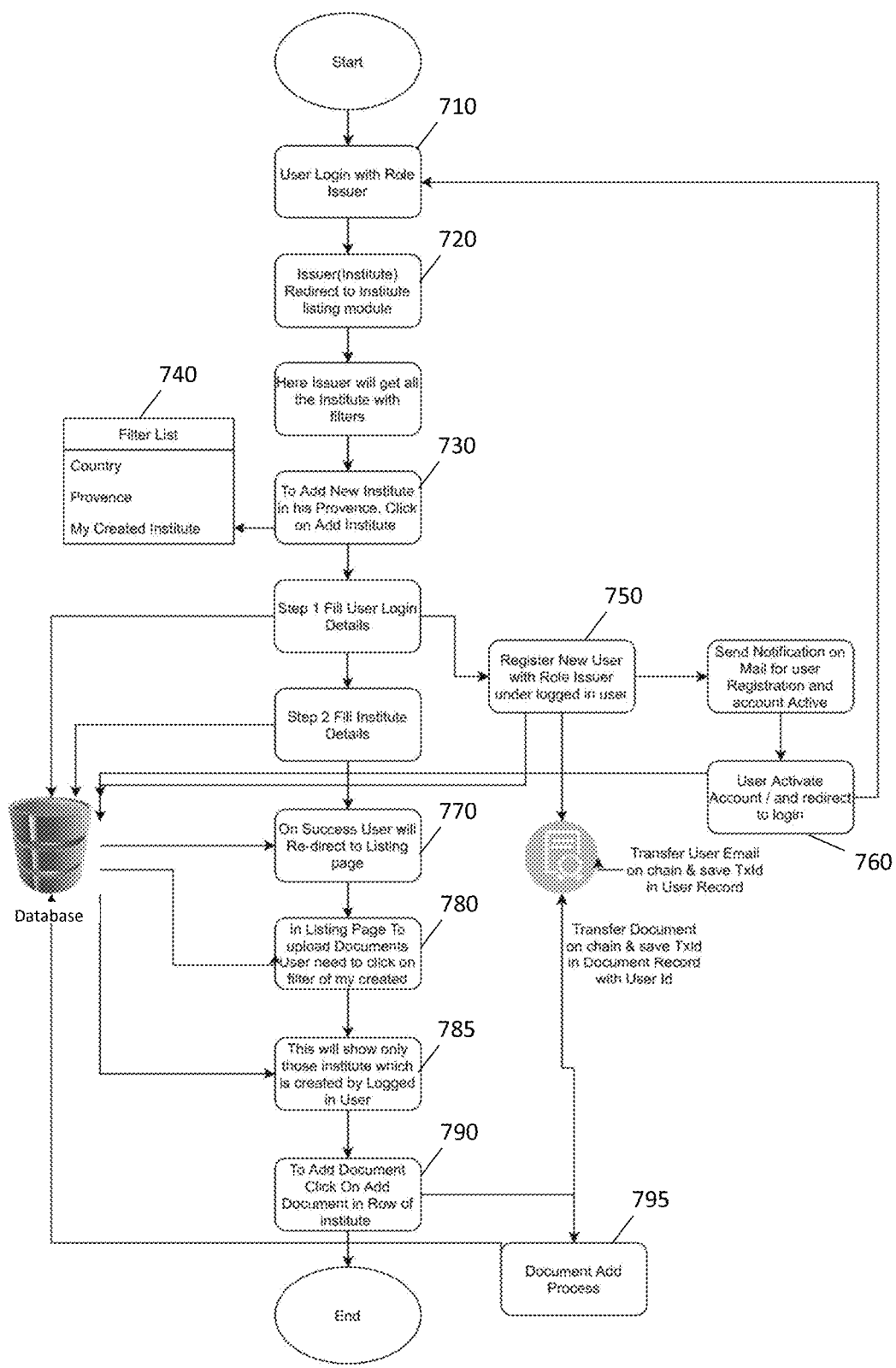
FIG. 7 is a flowchart depicting processing steps for adding an issuer, according to one embodiment.

This is an example of an application flow, with reference to FIG. 7, for adding an issuing party (issuer). Upon successful login 710, an issuer is directed 720 to a listing module including subsequent steps for entering issuer details relating to a particular network and jurisdiction (e.g., country and state/province) 730, 740. Other attributes of an issuer may include activation date, identity of other authorized users with the authority to maintain the issuer on the platform and/or add supported documents/credentials for that issuer 750, etc. Upon being added the issuer may then activate the account 760, and may be directed to a listing page 770 including subsequent steps 780, 785, and 790 for uploading documents, creating credentials, and adding credentials to the blackchain according to a document add process 795.

Example 8

Figure 8:
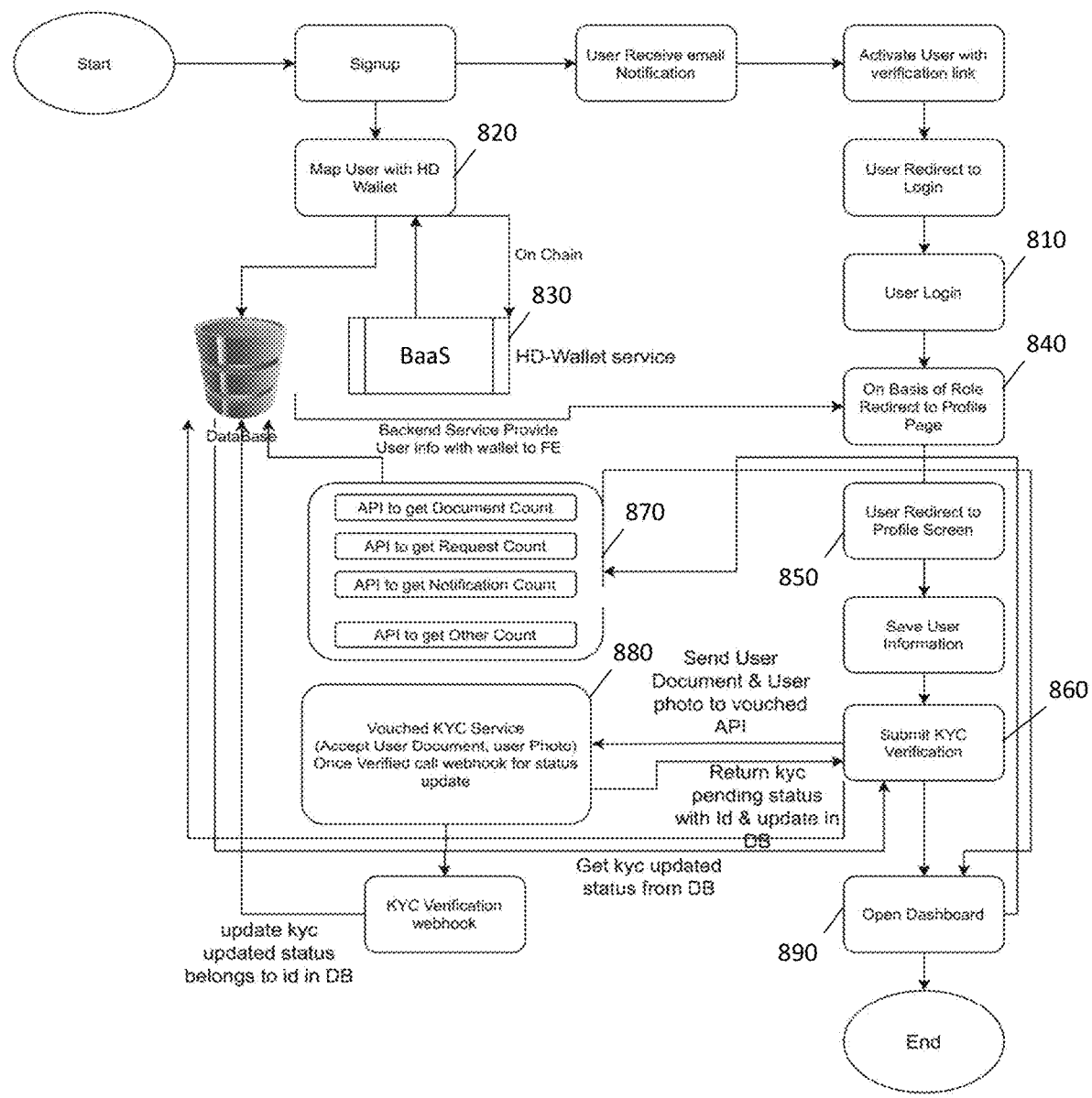
FIG. 8 is a flowchart depicting processing steps for a user login, signup, and on-chain and off-chain dependencies, according to one embodiment.

This is an example of an application flow, with reference to FIG. 8, of user login, identity verification, and user dashboard. Referring to FIG. 8, upon a user signing in 810, the application logic maps the user to a digital wallet 820 provided on a BaaS 830. Based on the type of user (holder, issuer, 3$^{rd}$ party, administrator) 840 redirected to the appropriate profile screen 850, following verification 860, the appropriate user dashboard is opened 890 with the associated content determined from the associated APIs 870. The user's identity verification status determines the user's ability to share and/or request credentials from any issuers 880.

Example 9

Figure 9:
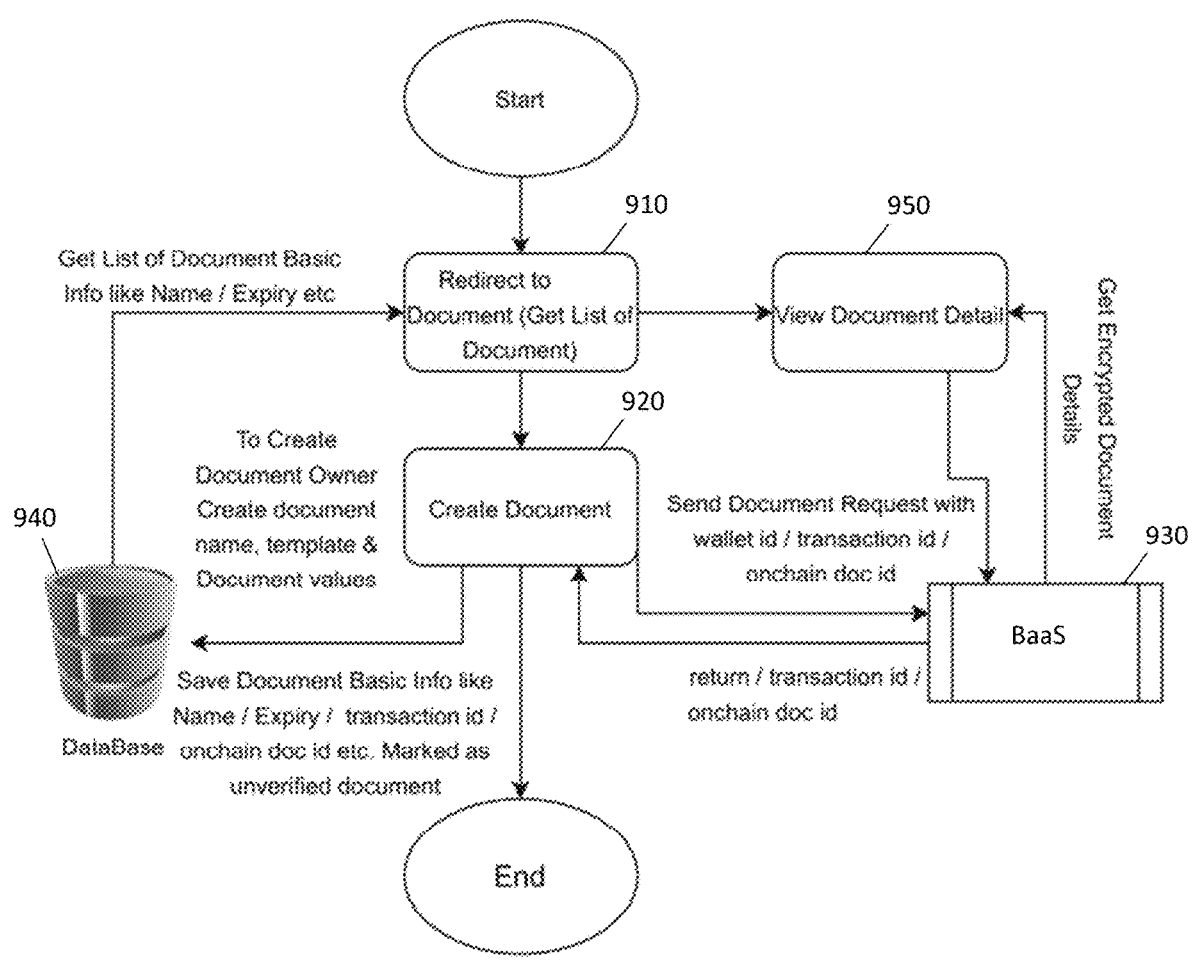
FIG. 9 is a flowchart depicting processing steps for a holder to create a document and a document flow, according to one embodiment.

This is an example of an application flow, with reference to FIG. 9, for a holder to create a document and generate a document listing. Referring to FIG. 9, upon logging in at 910 the holder may navigate to a create document 920 module where the holder inputs information relevant to the document and generates a document request which is sent to a blockchain (BaaS) 930 and document information may be stored on a database 940. At 910 the holder may also navigate to a view document module 950 to view documents, retrieve a listing of documents and their associated metadata, etc. The holder's digital walled ID may be used to access, retrieve, or store documents.

Example 10

Figure 10:
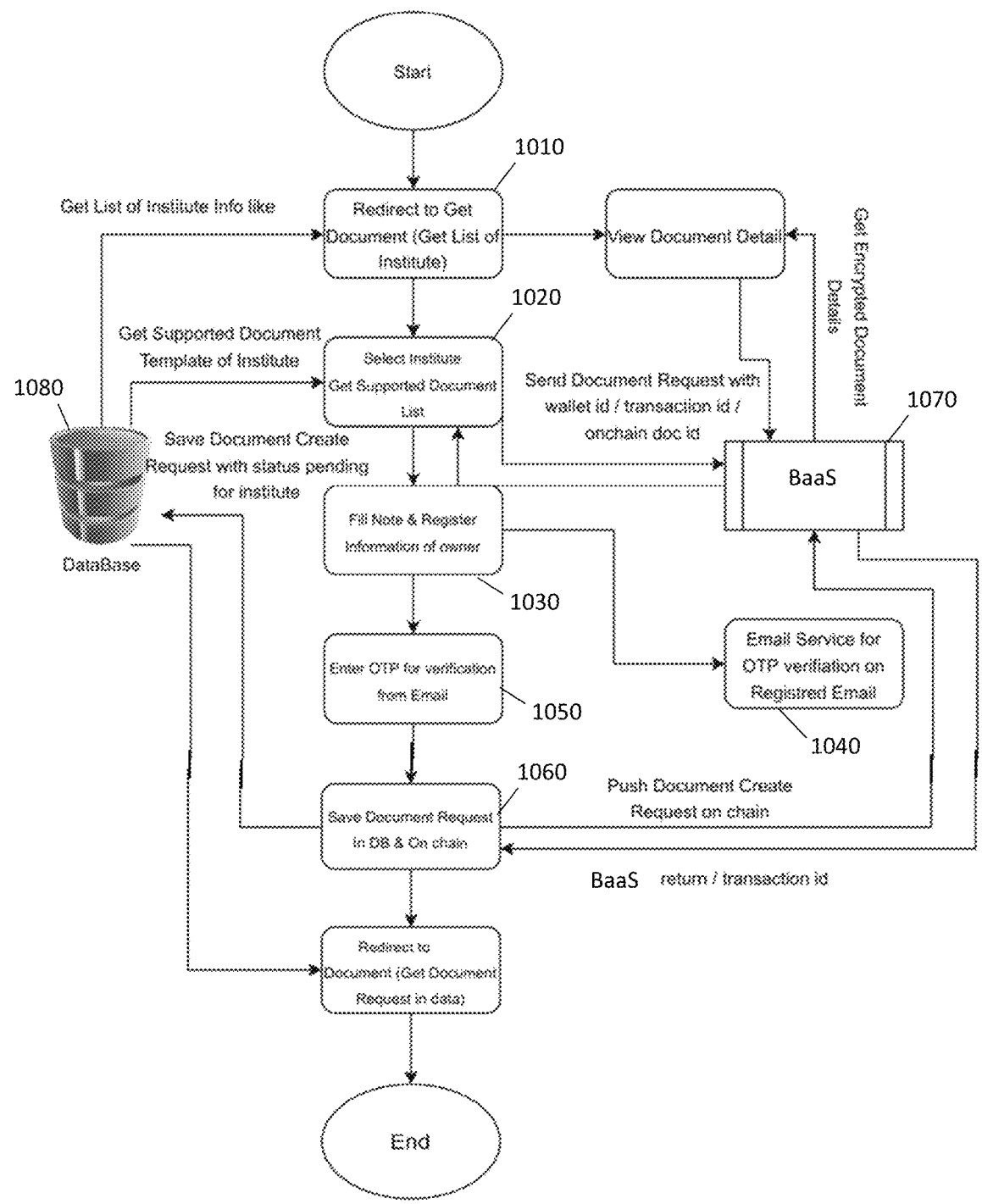
FIG. 10 is a flowchart depicting processing steps for a holder to create a request for a document from an issuer, according to one embodiment.

This is an example of an application flow, with reference to FIG. 10, for a holder creating a request for a document from an issuer. Referring to FIG. 10, a holder may search for a participating issuer on the platform 1010, view and select any supported documents that issuer delivers on the platform, and request 1020 a document from the issuer. Where the issuer has identified any data requirements in support of these requests—data entry fields, forms, etc.—the holder is presented with these requirements 1030 and can enter and/or upload these required documents to submit a valid and complete request to the issuer. On completion of this request, the user is sent a OTP (one-time password) to his registered email address 1040 that he is requested to enter to validate his request 1050. The document creation request is recorded 1060 on-chain 1070 and may also be saved on the datadase 1080.

Example 11

Figure 11:
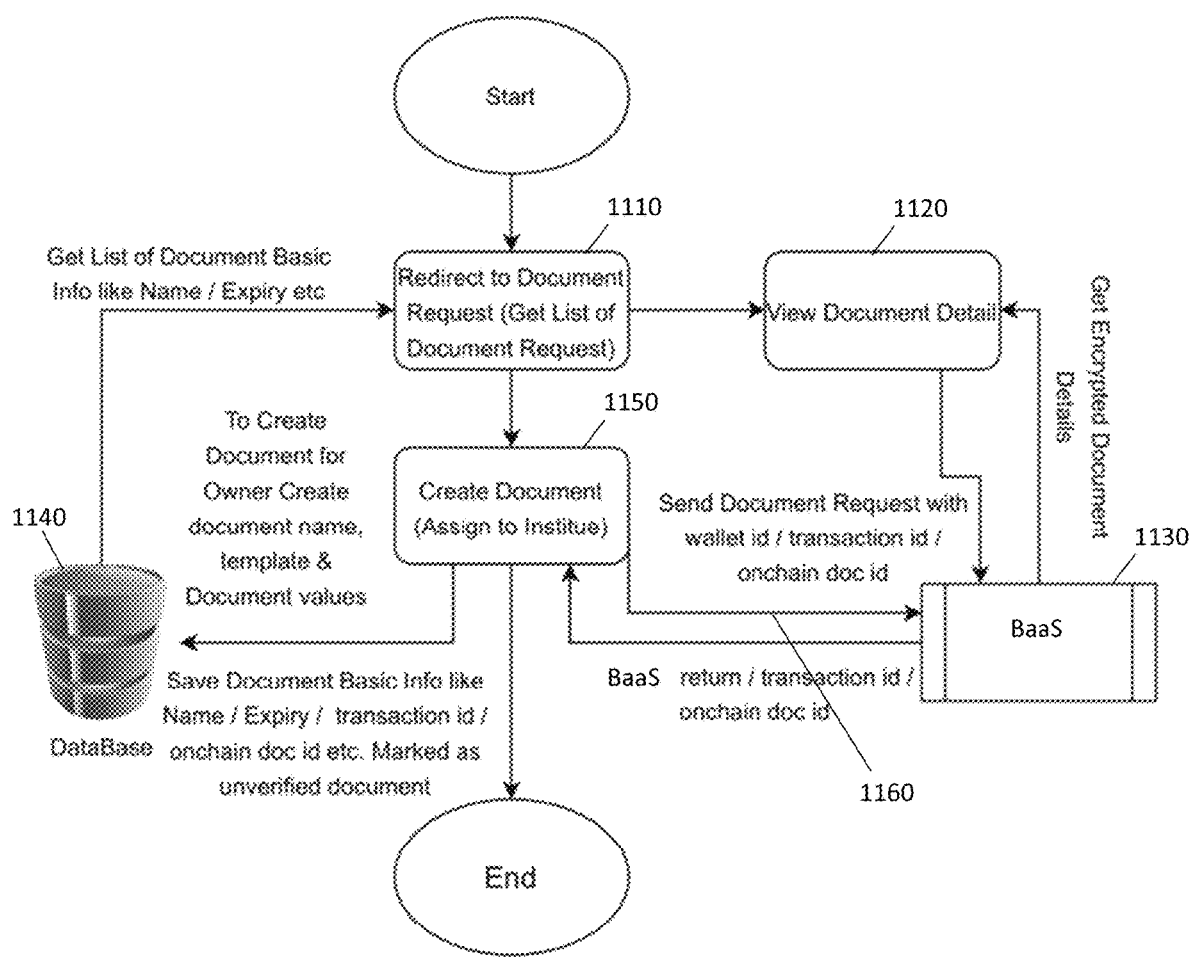
FIG. 11 is a flowchart depicting processing steps for an issuer sending a document to a holder, according to one embodiment.

This is an example of an application flow, with reference to FIG. 11, for an issuer sending a document to a holder in response to a complete request. Referring to FIG. 11, this flow depicts the logic path for an issuer to view and respond to requests for credentials they support on the platform from users of the platform with associated required data 1110. The issuer can review the request, retrieve and view document details 1120 from the BaaS 1130, also using information stored on a database 1140, and issue the requested credential as per the format defined by the issuer 1150. This activity is recorded 1160 on the BaaS 1130.

Example 12

An embodiment of the network platform was constructed and implemented across a network of devices configured as holder, issuer, $3^{rd}$ party, and administrator devices. Representative screenshots relating to various functionalities of the network platform are shown in FIGS. 6A-6B, 12-17 and 18A-18B, as may be provided by applications (i.e., software stored on computer readable media) running on processors of respective holder, issuer, $3^{rd}$ party, and administrator devices as part of a network platform according to embodiments described herein.

Figure 12:
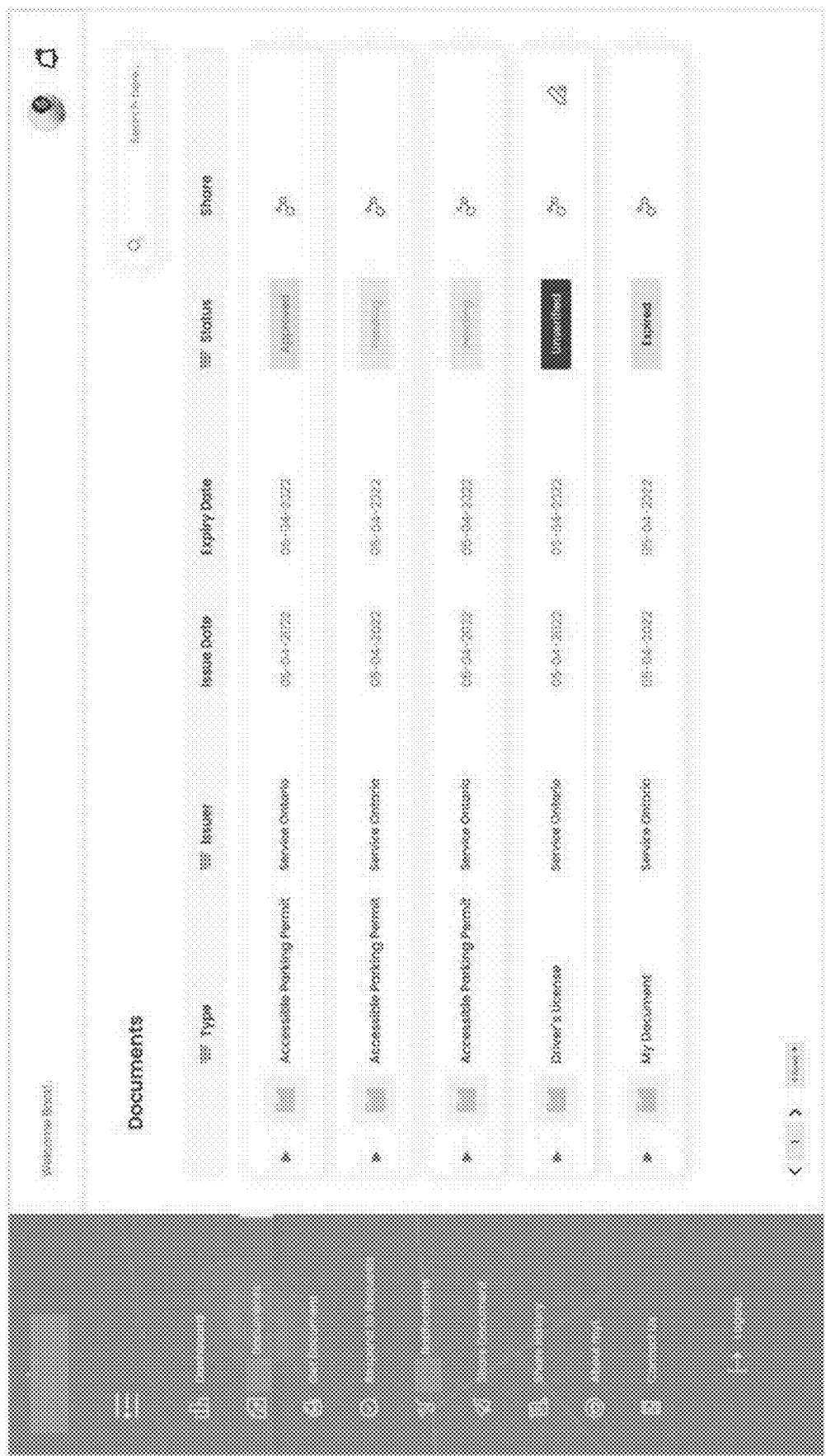
FIG. 12 is a screenshot of an exemplary holder document list, according to one embodiment.
Figure 13:
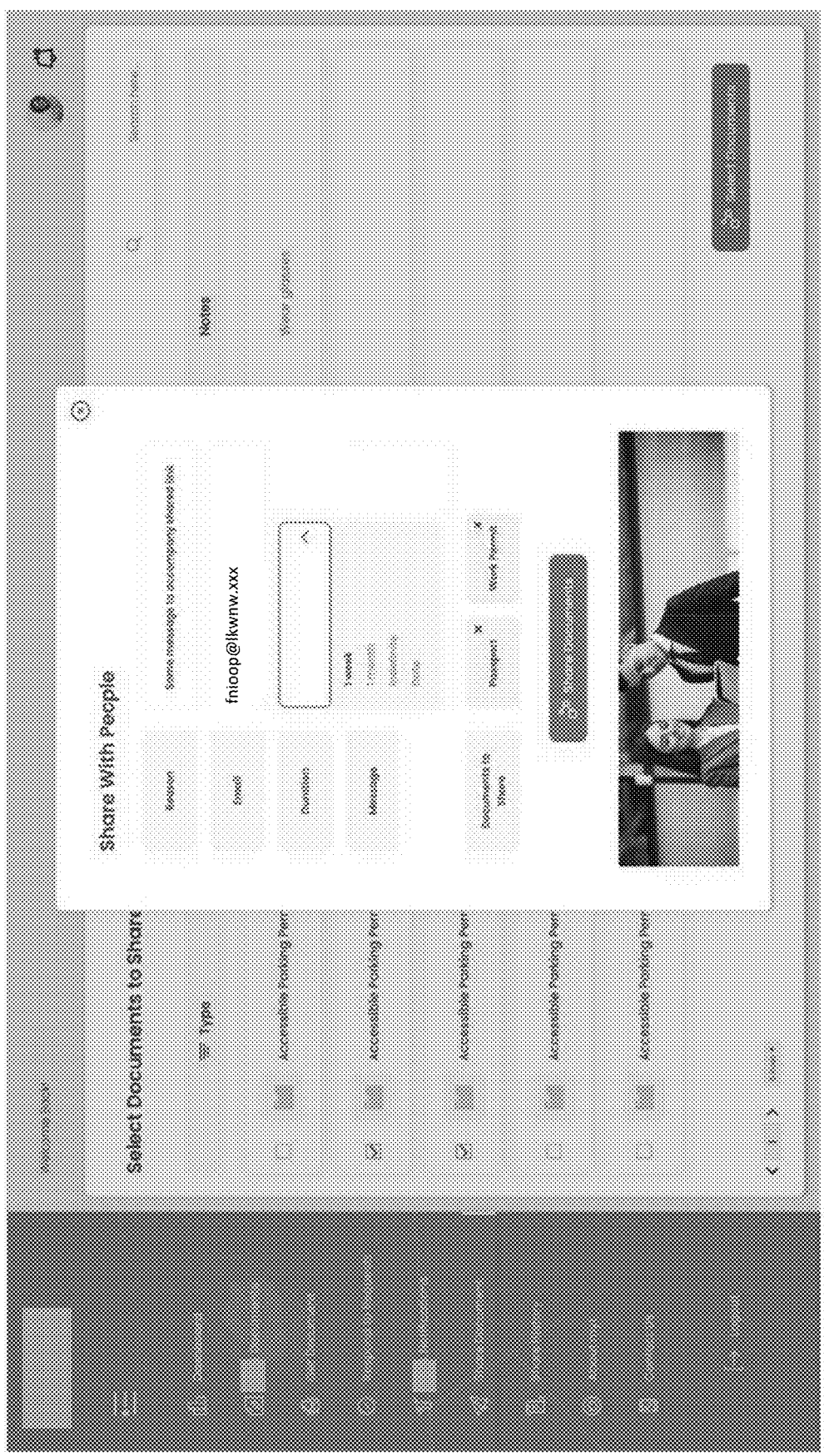
FIG. 13 is a screenshot of an exemplary holder share document screen, according to one embodiment.
Figure 14:
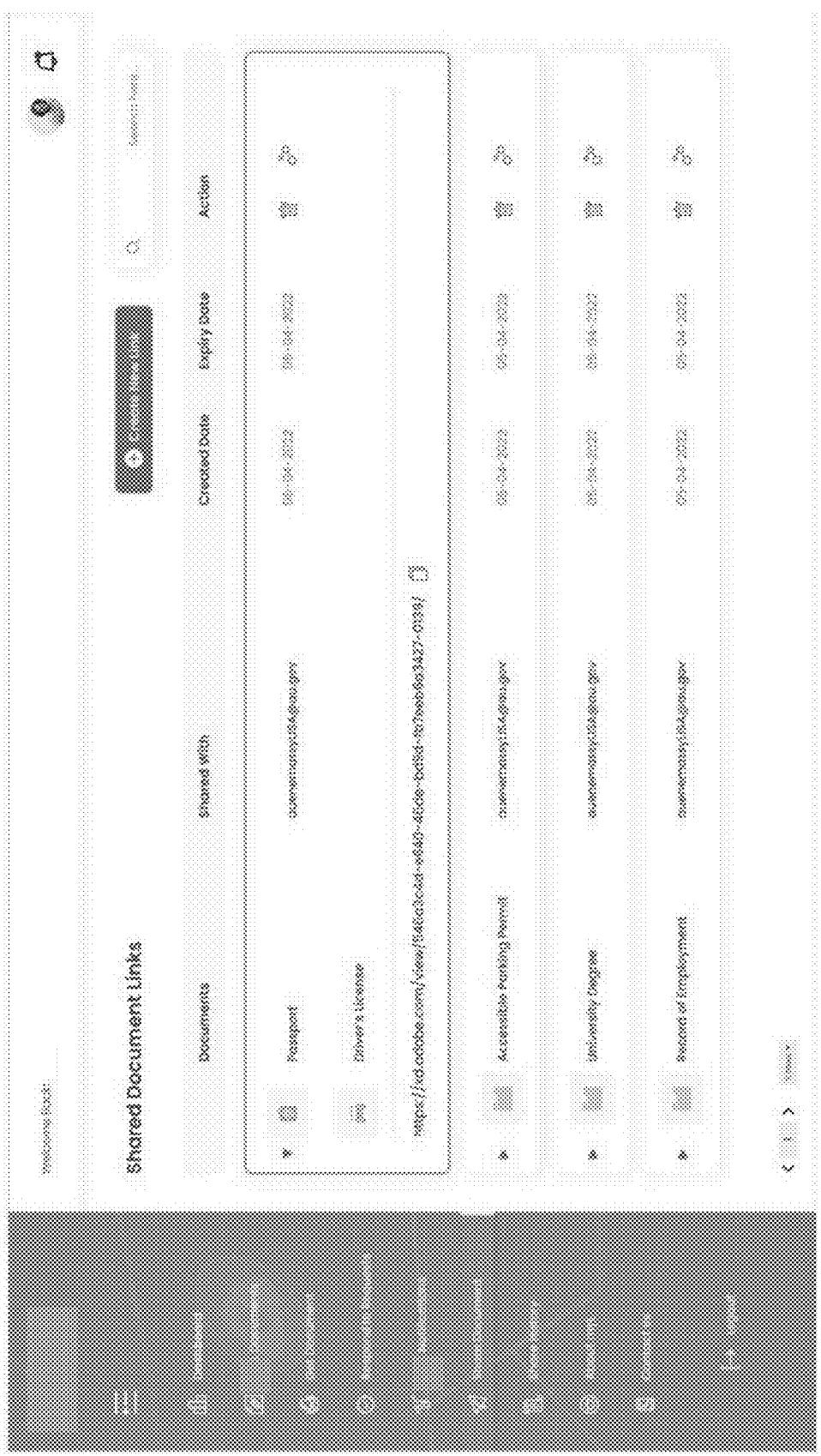
FIG. 14 is a screenshot of an exemplary holder share document history, according to one embodiment.
Figure 15:
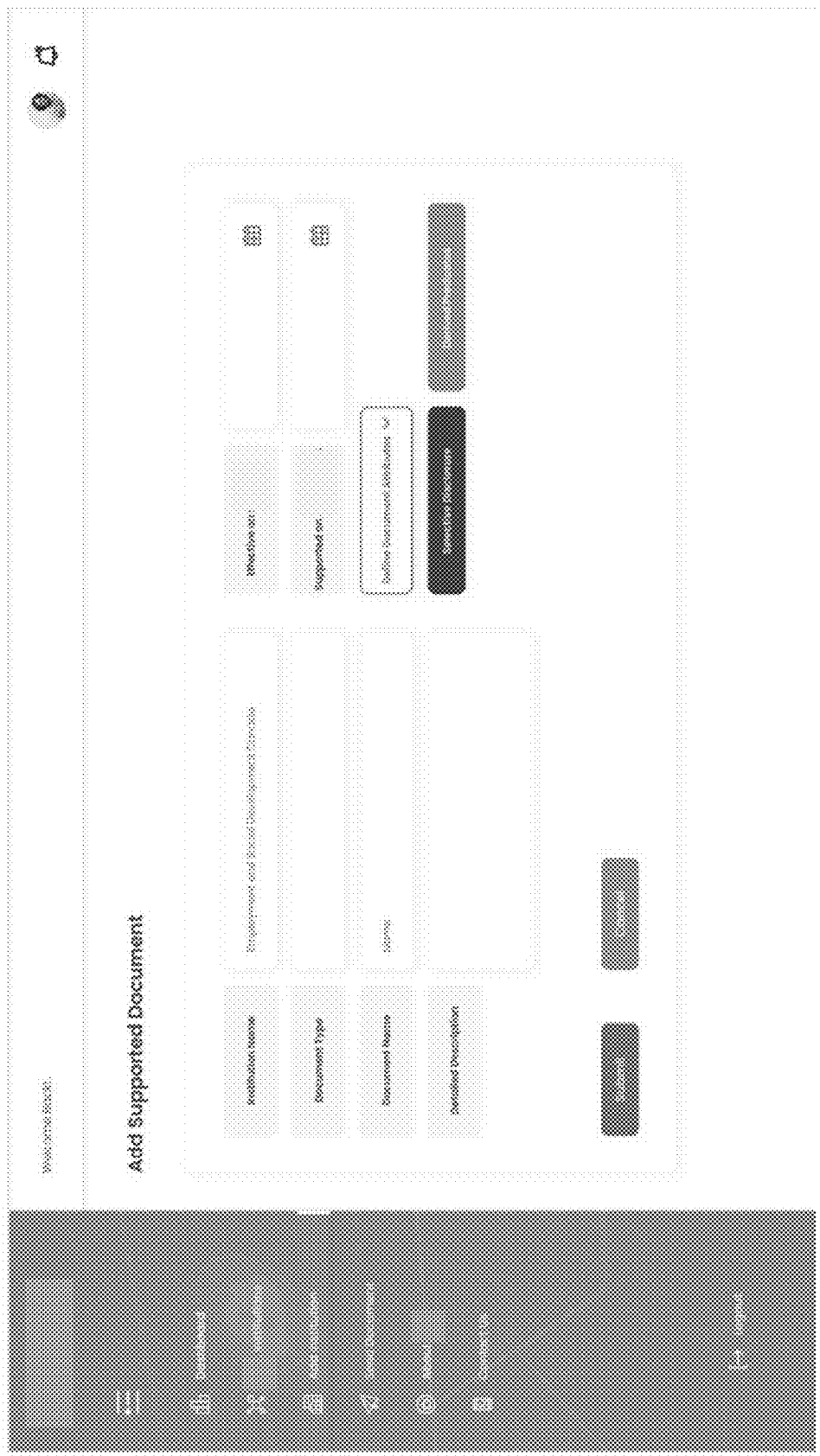
FIG. 15 is a screenshot of an exemplary issuer add supported document screen, according to one embodiment.
Figure 16:
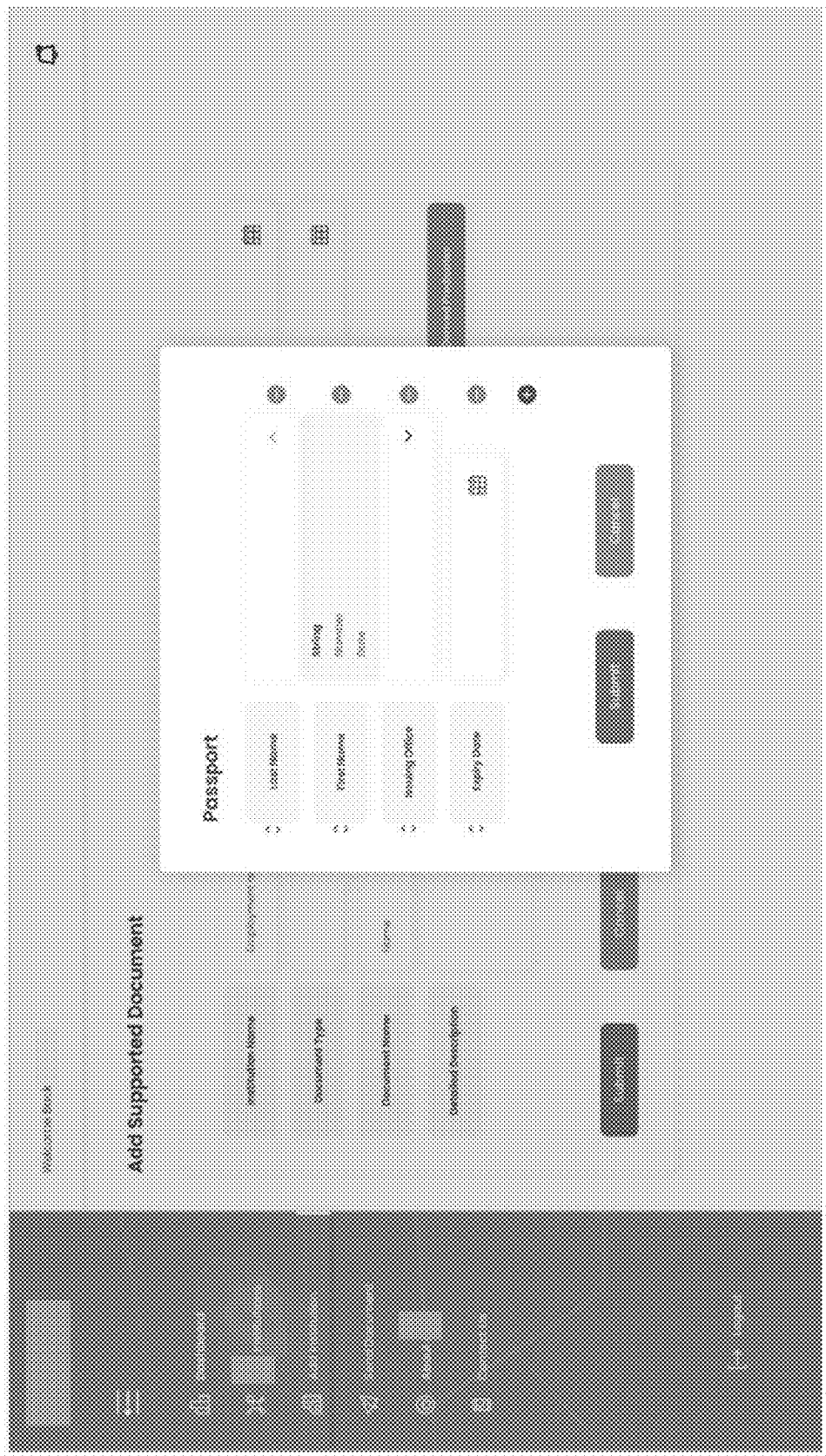
FIG. 16 is a screenshot of an exemplary issuer document definition screen, according to one embodiment.
Figure 17:
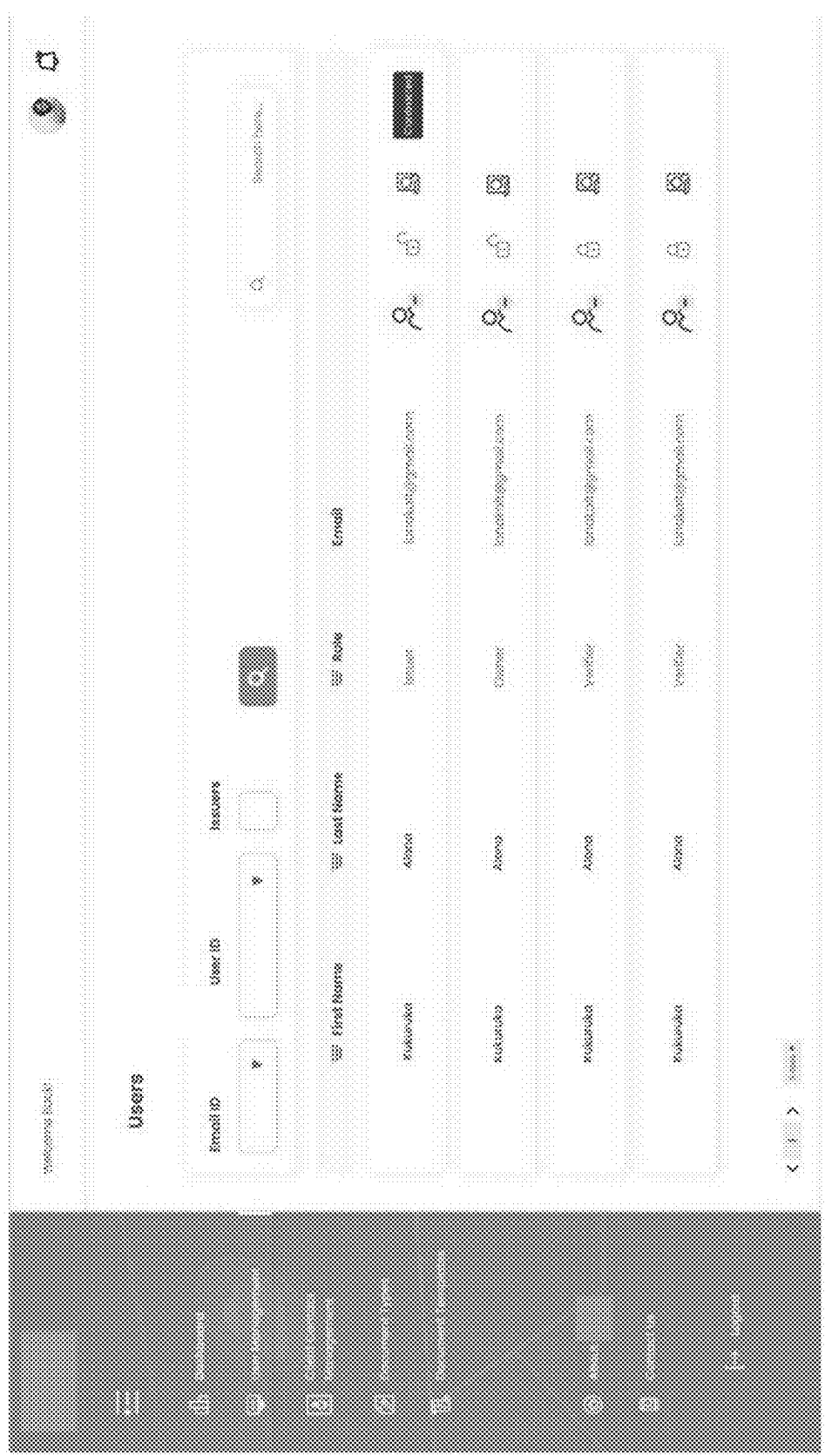
FIG. 17 is a screenshot of an exemplary administrative user management screen, according to one embodiment.
Figure 18A:
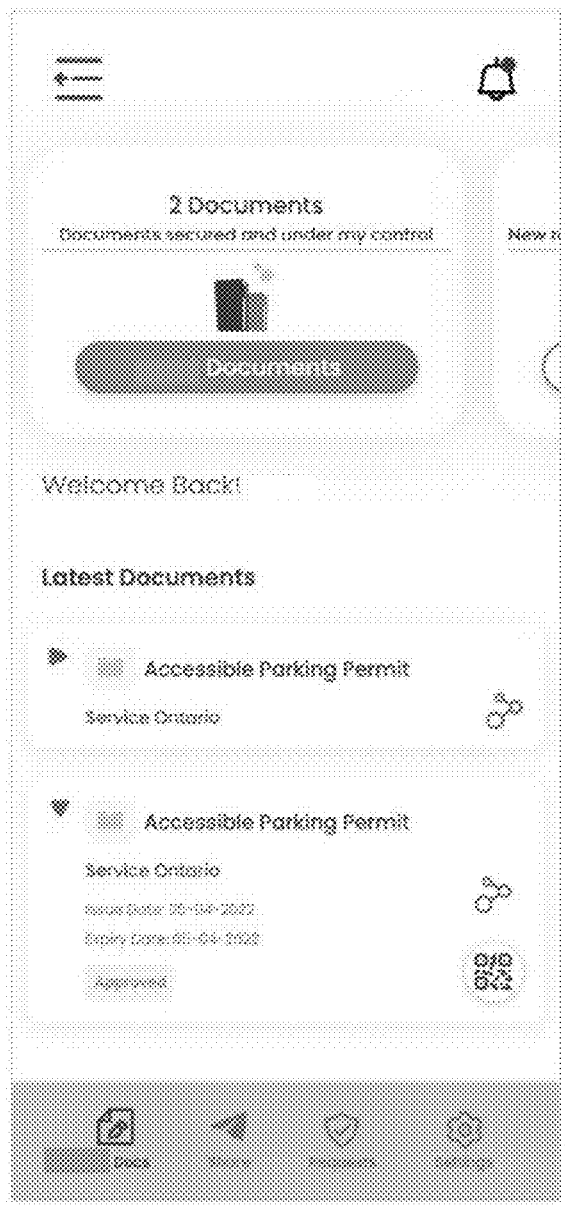
FIGS. 18A and 18B are screenshots of exemplary holder document listing and credential request screens, respectively, implemented on a mobile device such as a smartphone, according to one embodiment.
Figure 18B:
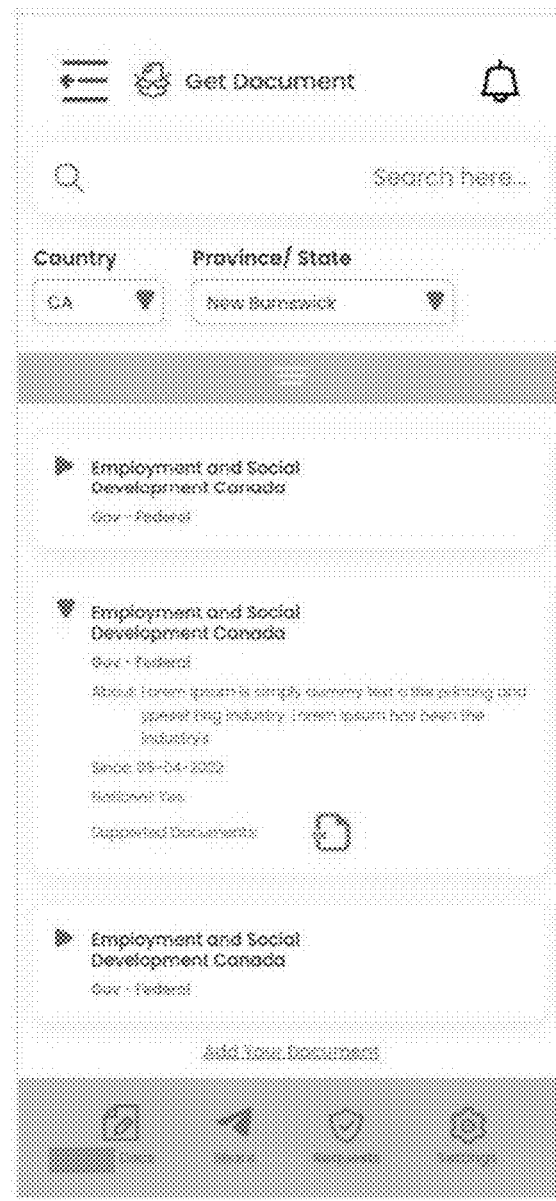

Representative screen shots according to this embodiment are provided as follows:

FIGS. 6A and 6B are screenshots of exemplary holder and $3^{rd}$ party dashboards, respectively;

FIG. 12 is a screenshot of an exemplary holder document list;

FIG. 13 is a screenshot of an exemplary holder share document screen;

FIG. 14 is a screenshot of an exemplary holder share document history;

FIG. 15 is a screenshot of an exemplary issuer add supported document screen;

FIG. 16 is a screenshot of an exemplary issuer document definition screen;

FIG. 17 is a screenshot of an exemplary administrative user management screen;

FIGS. 18A and 18B are screenshots of exemplary holder document listing and credential request screens, respectively, implemented on a mobile device such as a smartphone.

INCORPORATION BY REFERENCE

The contents of all cited publications are incorporated herein by reference in their entirety.

EQUIVALENTS

While the invention has been described with respect to illustrative embodiments thereof, it will be understood that various changes may be made to the embodiments without departing from the scope of the invention. Accordingly, the described embodiments are to be considered merely exemplary and the invention is not to be limited thereby.

The invention claimed is:

1. A network platform for issuing secure digital credentials, managing a holder's secure digital credentials, and requesting and receiving secure digital credentials, comprising:
   a plurality of devices connected together for communication with each other over the network;
   non-transitory computer-readable storage media implemented in each of the plurality of devices, the plurality of devices associated with network platform participants comprising at least one holder device, at least one issuer device, at least one $3^{rd}$ party device, and at least one administrator device;
   the non-transitory computer-readable storage media containing stored instructions executable by a processor of each of the plurality of devices, wherein the stored instructions enable the devices to communicate with each other over the network and carry out processing steps, including:
   the at least one holder device provides information relating to a holder credential to the at least one issuer device;
   the at least one issuer device uses the information to define metadata of the credential and generate and issue a secure credential;
   the at least one issuer device creates at least one derived predicate that is calculated based on an attribute of the secure credential metadata wherein the calculation is defined by the at least one issuer device;
   the at least one issuer device provides the at least one derived predicate to the at least one holder device and the at least one holder device controls use of the at least one derived predicate including providing the at least one derived predicate to the at least one $3^{rd}$ party device for a $3^{rd}$ party transaction without disclosing the complete secure credential;
   the secure credential is maintained over a distributed ledger technology that creates redundancy and provides fidelity in the secure credential;
   the at least one holder device has access to the secure credential and controls access to the secure credential by the at least one $3^{rd}$ party device over the network;
   the at least one $3^{rd}$ party device is granted access to at least a portion of the metadata in the credential by the at least one holder device; and
   the secure credential provides verification of the at least a portion of the metadata to the at least one $3^{rd}$ party device that is granted access.

2. The network platform of claim 1, wherein the at least one issuer device performs at least one of defining credentials, maintaining definition of credentials, defining requirements for requests, and issuing and revoking credentials to the at least one holder device.

3. The network platform of claim 1, comprising the at least one issuer device establishing an ecosystem of $3^{rd}$ parties with common interests to facilitate sharing of credentials among network participants.

4. The network platform of claim 1, comprising the at least one issuer device establishing a consortium of members that collectively participate in a private or permissioned environment so that only the consortium members can view, define, issue, maintain, or revoke credentials to other network participants or holders.

5. The network platform of claim 4, comprising two or more consortiums, wherein the two or more consortiums co-exist on the network platform without sharing data or transactional knowledge about issuers, holders, and/or $3^{rd}$ parties.

6. The network platform of claim 1, wherein the at least one issuer device defines a selective disclosure associated with a credential issued by that issuer device.

7. The network platform of claim 6, wherein the selective disclosure comprises a declarative statement or assertion associated with an issued credential that is used by the holder device and provided to the at least one $3^{rd}$ party device to support a fact in the credential without revealing the entire credential.

8. The network platform of claim 1, wherein the derived predicate comprises a statement based on a Boolean condition that is provided to the at least one $3^{rd}$ party device with respect to a credential.

9. The network platform of claim 1, wherein an issuer updates, revokes, or updates and revokes a credential without a requirement for instructions of the holder of the credential.

10. The network platform of claim 1, comprising a digital wallet that stores holder credentials and is accessible only by the at least one holder device.

11. The network platform of claim 1, wherein a $3^{rd}$ party that is not a network platform member requests or receives a credential of a holder on the network platform.

12. The network platform of claim 1, comprising a token rewards program for network platform participants that provides rewards or incentives to issuers, holders, and 3rd parties for issuing, requesting, and/or sharing their credentials.

13. The network platform of claim 1, wherein the distributed ledger technology comprises a blockchain.

14. A method for issuing credentials, managing a holder's digital credentials, and requesting and receiving digital credentials across a network, comprising:
  providing a plurality of devices connected together for communication with each other over the network, the plurality of devices associated with network participants comprising at least one holder device, at least one issuer device, at least one $3^{rd}$ party device, and at least one administrator device;
  wherein each device of the plurality of devices includes non-transitory computer-readable storage media containing stored instructions executable by a processor of each of the plurality of devices, wherein the stored instructions enable the devices to communicate with each other over the network and carry out processing steps, including:
  the at least one holder device provides information relating to a holder credential to the at least one issuer device;
  the at least one issuer device uses the information to define metadata of the credential and generate and issue a secure credential;
  the at least one issuer device creates at least one derived predicate that is calculated based on an attribute of the secure credential metadata wherein the calculation is defined by the at least one issuer device;
  the at least one issuer device provides the at least one derived predicate to the at least one holder device and the at least one holder device controls use of the at least one derived predicate including providing the at least one derived predicate to the at least one $3^{rd}$ party device for a $3^{rd}$ party transaction without disclosing the complete secure credential;
  the secure credential is maintained over a distributed ledger technology that creates redundancy and provides fidelity in the secure credential;
  the at least one holder device has access to the secure credential and controls access to the secure credential by the at least one $3^{rd}$ party device over the network;
  the at least one $3^{rd}$ party device is granted access to at least a portion of the metadata in at the credential by the at least one holder device; and
  the secure credential provides verification of the at least a portion of the metadata to the at least one $3^{rd}$ party device that is granted access.

15. The method of claim 14, wherein the at least one issuer device performs at least one of defining credentials, maintaining definition of credentials, defining requirements for requests, and issuing and revoking credentials to holder devices.

16. The method of claim 14, comprising the at least one issuer device establishing an ecosystem of $3^{rd}$ parties with common interests to facilitate sharing of credentials among network participants.

17. The method of claim 14, comprising the at least one issuer device establishing a consortium of members that collectively participate in a private or permissioned environment so that only the consortium members can view, define, issue, maintain, or revoke credentials to other network participants or holders.

18. The method of claim 17, comprising two or more consortiums, wherein the two or more consortiums co-exist on the network platform without sharing data or transactional knowledge about issuers, holders, and/or $3^{rd}$ parties.

19. The method of claim 14, comprising the issuer device defining a selective disclosure associated with a credential issued by that issuer device.

20. The method of claim 19, wherein the selective disclosure comprises a declarative statement or assertion associated with an issued credential that is used by the holder device and provided to the at least one $3^{rd}$ party device to support a fact in the credential without revealing the entire credential.

21. The method of claim 14, wherein the derived predicate comprises a statement based on a Boolean condition that is provided to the at least one $3^{rd}$ party device with respect to a credential.

22. The method of claim 14, wherein an issuer updates, revokes, or updates and revokes a credential without a requirement for instructions of the holder of the credential.

23. The method of claim 14, comprising using a digital wallet that stores holder credentials and is accessible only by the at least one holder device.

24. The method of claim 14, wherein a $3^{rd}$ party that is not a network platform member requests or receives a credential of a holder on the network platform.

25. The method of claim 14, comprising implementing a token rewards program for network platform participants that provides rewards or incentives to issuers, holders, and $3^{rd}$ parties for issuing, requesting, and/or sharing their credentials.

26. The method of claim 14, wherein the distributed ledger technology comprises a blockchain.

27. Programmed media for use with a plurality of devices connected together for communication with each other over a network, each device comprising a processor, comprising:
  non-transitory computer readable storage media storing computer code compatible with the processors of the plurality of devices, the code containing instructions to direct the processors to implement a network platform in each of the plurality of devices, wherein the plurality of devices are individually associated with network platform participants comprising at least one holder device, at least one issuer device, at least one $3^{rd}$ party device, and at least one administrator device;
  wherein the stored instructions enable the devices to communicate with each other over the network and carry out processing steps for issuing credentials, managing a holder's digital credentials, and requesting and receiving digital credentials, comprising:
  the at least one holder device provides information relating to a holder credential to the at least one issuer device;
  the at least one issuer device uses the information to define metadata of the credential and generate and issue a secure credential;
  the at least one issuer device creates at least one derived predicate that is calculated based on an attribute of the secure credential metadata wherein the calculation is defined by the at least one issuer device;

the at least one issuer device provides the at least one derived predicate to the at least one holder device and the at least one holder device controls use of the at least one derived predicate including providing the at least one derived predicate to the at least one $3^{rd}$ party device for a $3^{rd}$ party transaction without disclosing the complete secure credential;

the secure credential is maintained over a distributed ledger technology that creates redundancy and provides fidelity in the secure credential;

the at least one holder device has access to the secure credential and controls access to the secure credential by the at least one 3rd party device over the network;

the at least one $3^{rd}$ party device is granted access to at least a portion of the metadata in at the credential by the at least one holder device; and the secure credential provides verification of the at least a portion of the metadata to the at least one $3^{rd}$ party device that is granted access.

28. The programmed media of claim 27, wherein the processing steps include the at least one issuer device performing at least one of defining credentials, maintaining definition of credentials, defining requirements for requests, and issuing and revoking credentials to holder devices.

29. The programmed media of claim 27, wherein the processing steps include the at least one issuer device establishing an ecosystem of $3^{rd}$ parties with common interests to facilitate sharing of credentials among network participants.

30. The programmed media of claim 27, wherein the processing steps include the at least one issuer device establishing a consortium of members that collectively participate in a private or permissioned environment so that only the consortium members can view, define, issue, maintain, or revoke credentials to other network participants or holders.

31. The programmed media of claim 30, wherein the processing steps include establishing two or more consortiums, wherein the two or more consortiums co-exist on the network platform without sharing data or transactional knowledge about issuers, holders, and/or $3^{rd}$ parties.

32. The programmed media of claim 27, wherein the processing steps include the at least one issuer device defining a selective disclosure associated with a credential issued by that issuer.

33. The programmed media of claim 32, wherein the processing steps include defining a selective disclosure comprising a declarative statement or assertion associated with an issued credential that is used by the holder device and provided to the at least one $3^{rd}$ party device to support a fact in the credential without revealing the entire credential.

34. The programmed media of claim 27, wherein the processing steps include defining a derived predicate comprising a statement based on a Boolean condition that is provided to the at least one $3^{rd}$ party device with respect to a credential.

35. The programmed media of claim 27, wherein the processing steps include an issuer device updating, revoking, or updating and revoking a credential without a requirement for instructions of the holder of the credential.

36. The programmed media of claim 27, wherein the processing steps include providing a digital wallet that stores holder credentials and is accessible only by the at least one holder device.

37. The programmed media of claim 27, wherein the processing steps include a $3^{rd}$ party that is not a network platform member requesting or receiving a credential of a holder on the network platform.

38. The programmed media of claim 27, wherein the processing steps provide a token rewards program to network platform participants that provides rewards or incentives to issuers, holders, and $3^{rd}$ parties for issuing, requesting, and/or sharing their credentials.

39. The programmed media of claim 27, wherein the processing steps include use a distributed ledger technology comprising a blockchain.

\* \* \* \* \*